US006434582B1

(12) United States Patent
Choe et al.

(10) Patent No.: US 6,434,582 B1
(45) Date of Patent: Aug. 13, 2002

(54) COSINE ALGORITHM FOR RELATIVELY SMALL ANGLES

(75) Inventors: Gwangwoo Choe; James R. MacDonald, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/336,394

(22) Filed: Jun. 18, 1999

(51) Int. Cl.[7] .............................. G06F 1/02; G06F 7/38
(52) U.S. Cl. ....................... 708/276; 708/440
(58) Field of Search .................... 708/8, 276, 440

(56) References Cited

U.S. PATENT DOCUMENTS

| | | | | |
|---|---|---|---|---|
| 3,789,393 A | * | 1/1974 | Tripp ........................ | 708/440 |
| 4,486,846 A | * | 12/1984 | McCallister et al. .......... | 708/8 |
| 4,718,030 A | * | 1/1988 | Tsutsumi .................... | 708/276 |
| 4,809,205 A | * | 2/1989 | Freeman ..................... | 708/276 |
| 4,827,442 A | * | 5/1989 | Mehrgardt et al. .......... | 708/276 |
| 4,855,946 A | * | 8/1989 | Ruben et al. ............... | 708/276 |
| 5,019,968 A | | 5/1991 | Wang et al. | |
| 5,235,535 A | * | 8/1993 | Nakayama .................. | 708/440 |
| 5,317,753 A | | 5/1994 | Kuenemund et al. | |
| 5,954,787 A | * | 9/1999 | Eun .......................... | 708/276 |
| RE36,388 E | * | 11/1999 | Fox et al. ................... | 708/276 |
| 5,991,788 A | * | 11/1999 | Mintzer ...................... | 708/440 |

OTHER PUBLICATIONS

Volder, "The CORDIC Trigonometric Computing Technique," presented at the Western Joint Computer Conf., San Francisco, CA, Mar. 1959, pp. 226–230.
Timmerman, "Modified CORDIC Algorithm with Reduced Iterations," May 1989, 2 pages.
Hu et al., "An Angle Recoding Method for CORDIC Algorithm Implementation," IEEE Transactions on Computers, vol. 42, No. 1, Jan. 1993, pp. 99–101.
Walther, "A unified algorithm for elementary functions," ©by the American Federation of Information Processing Societies, Inc., pp. 272–278, 1971.
Cyliax, "CORDIC (Coordinate Rotation Digital Computer)," ©1997 by Ingo Cyliax, 2 pages.
"Tutorial of CORDIC Algorithm," printed from http://devil, ece.utexas.

* cited by examiner

Primary Examiner—Tan V. Mai
(74) Attorney, Agent, or Firm—Conley, Rose & Tayon, PC; B. Noël Kivlin

(57) ABSTRACT

A system and method for computing the cosine of an input value. The system comprises a logical processing unit and an addition unit. The logical processing unit comprises an input bus with a plurality of input lines for receiving an input angle value. The logical processing unit includes a first plurality of gates, preferably AND gates, coupled to the input bus. Each gate of the first plurality of gates couples to two or more of the input lines. The logical processing unit generates N output operands on N corresponding output buses. At least one of the output buses includes (a) at least one output line coupled to an output of one of the first plurality of gates, and (b) at least one output line coupled to one of the input lines of the input bus. The number N of output buses is greater than or equal to two. The addition unit couples to the N output buses of the logical processing unit, and is configured to perform an addition of the N binary operands provided on the N output buses. The addition unit generates a resultant number which represents the cosine of the input operand conveyed on the input bus. The input angle value is assumed to have a predetermined number of leading zeros. In general, output lines are coupled to (a) input lines, (b) outputs of gates, or (c) set equal to zero.

14 Claims, 17 Drawing Sheets

*FIG. 6*
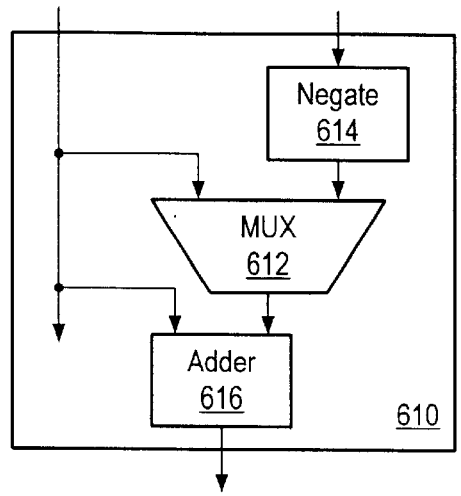
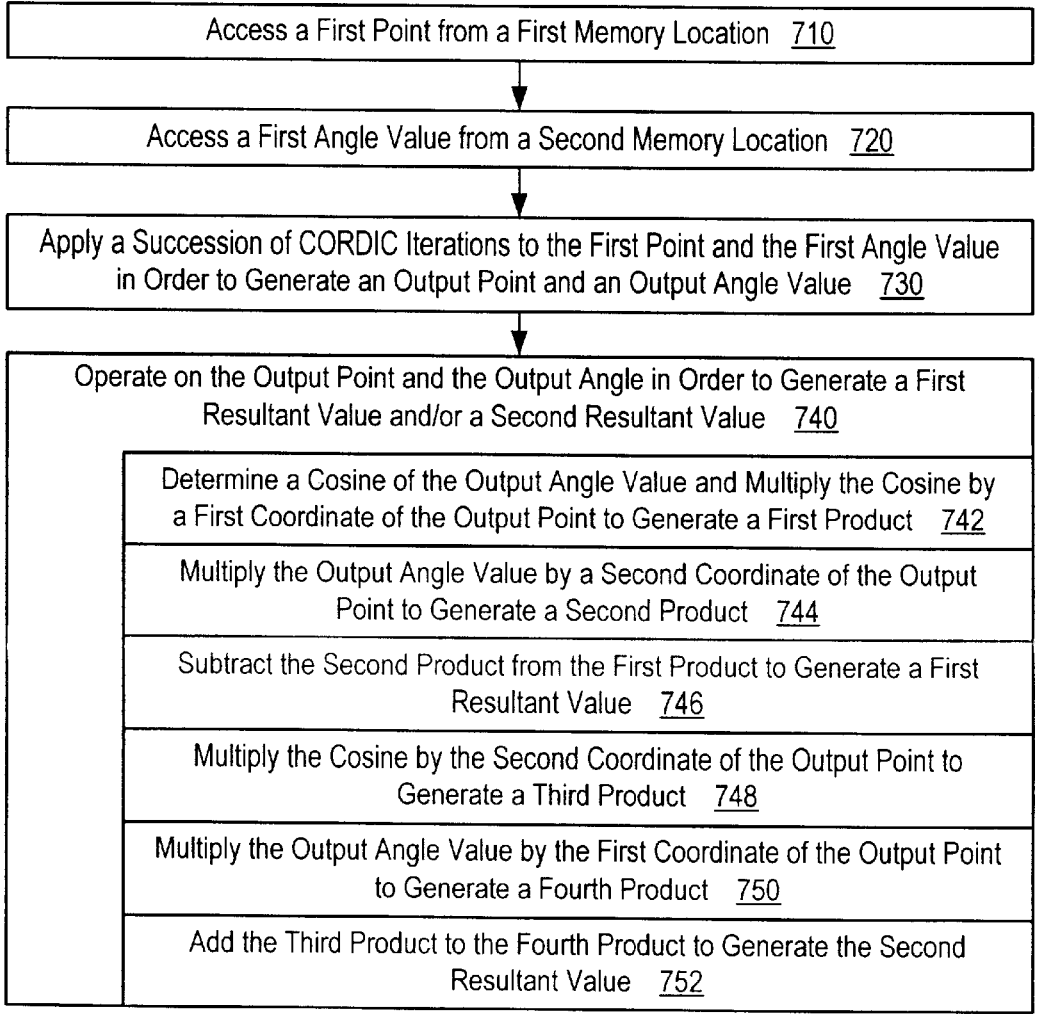
FIG 7

FIG. 11B

| $a_0$ | $a_1$ | $a_2$ | $a_3$ | $a_4$ | $a_5$ | $a_6$ | $a_7$ | $a_8$ | $a_9$ | $a_{10}$ | $a_{11}$ |
|---|---|---|---|---|---|---|---|---|---|---|---|
| 0 | 0 | 0 | 0 | 0 | 0 | x | x | x | x | x | x |

FIG. 11C

|  | $2^{-13}$ | $2^{-14}$ | $2^{-15}$ | $2^{-16}$ | $2^{-17}$ | $2^{-18}$ | $2^{-19}$ | $2^{-20}$ | $2^{-21}$ | $2^{-22}$ | $2^{-23}$ |
|---|---|---|---|---|---|---|---|---|---|---|---|
| $q_1$ | (6) | (6,8) | (7) | (7,9) | (8) | (8,10) | (9) | (9,11) | (10) | 0 | (11) |
| $q_2$ | (6,7) | 0 | (7,8) | (6,10) | (8,9) | (7,11) | (9,10) | 0 | (10,11) | 0 | 0 |
| $q_3$ | 0 | 0 | (6,9) | 0 | (7,10) | 0 | (8,11) | 0 | 0 | 0 | 0 |
| $q_4$ | 0 | 0 | 0 | 0 | (6,11) | 0 | 0 | 0 | 0 | 0 | 0 |

FIG. 12A

| $a_0$ | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ |
|---|---|---|---|---|---|---|---|---|---|---|---|---|---|---|---|
| 0 | 0 | 0 | 0 | 0 | 0 | 0 | 0 | 0 | x | x | x | x | x | x | x |

FIG. 12B

| | $2^{-19}$ | $2^{-20}$ | $2^{-21}$ | $2^{-22}$ | $2^{-23}$ | $2^{-24}$ | $2^{-25}$ | $2^{-26}$ | $2^{-27}$ | $2^{-28}$ | $2^{-29}$ | $2^{-30}$ | $2^{-31}$ | $2^{-32}$ | $2^{-33}$ |
|---|---|---|---|---|---|---|---|---|---|---|---|---|---|---|---|---|
| $q_1$ | 9 | 9,11 | 10 | 10,12 | 11 | 11,13 | 12 | 12,14 | 13 | 13,15 | 14 | 14,16 | 15 | | 16 |
| $q_2$ | 9,10 | | 10,11 | | 11,12 | 10,14 | 12,13 | 11,15 | 13,14 | 12,16 | 14,15 | | 15,16 | | |
| $q_3$ | | 9,12 | | 9,13 | 10,13 | 9,15 | 11,14 | 10,16 | 12,15 | | 13,16 | | | | |
| $q_4$ | | | | | 9,14 | | 10,15 | | 11,16 | | | | | | |
| $q_5$ | | | | | | | 9,16 | | | | | | | | |

COSINE ALGORITHM FOR RELATIVELY SMALL ANGLES

BACKGROUND OF THE INVENTION

1. Field of the Invention

The present invention relates to a system and method for evaluating the cosine of relatively small angles, i.e. angles whose magnitude are close to zero.

2. Description of the Related Art

In an article entitled "The CORDIC Trigonometric Computing Technique", authored by Jack E. Volder, and published in IRE Trans. Electron. Comput. EC-8:330-334 (1959), Volder describes the Coordinate Rotation Digital Computer (CORDIC). In this article, which is incorporated by reference in its entirety, Volder discloses a computational algorithm based on a convergent series of elementary rotations. This algorithm will be referred to herein as the CORDIC algorithm. The CORDIC algorithm in its various realizations may be used to compute a variety of elementary functions such as, e.g., sine, cosine, tangent, arctangent, exponential, logarithm, hyperbolic sine, hyperbolic cosine, hyperbolic tangent, etc. In addition, the CORDIC algorithm may also be used to compute two-dimensional rotations, multiplications, divisions and square roots.

The CORDIC algorithm receives an input point $(X_0,Y_0)$ and an input angle $\lambda_0$, and applies a series of iterations to these input operands. Each iteration of the series operates on a current intermediate point $(X_i,Y_i)$ and a current residual angle $\lambda_i$, and generates an updated intermediate point $(X_{i+1},Y_{i+1})$ and an updated residual angle $\lambda_{i+1}$. In the first iteration, the current intermediate point is taken to be the input point $(X_0,Y_0)$ and the current residual angle is taken to be the input angle $\lambda_0$. A mathematical analysis of the CORDIC algorithm reveals that the intermediate point $(X_i, Y_i)$ converges as the iteration index increases. The limiting resultant point is given by the equations $$X_R = KR_0\cos(\theta_0 + \lambda_0) = \lim_{i \to \infty} X_i \qquad (1)$$

$$Y_R = KR_0\sin(\theta_0 + \lambda_0) = \lim_{i \to \infty} Y_i, \qquad (2)$$

where K is a known constant, $R_0$ is the radius of the point $(X_0,Y_0)$ with respect to the origin, and $\theta_0$ is the counterclockwise angle of the input point $(X_0,Y_0)$ with respect to the positive x axis. Geometrically, the resultant point $(X_R, Y_R)$ is a rotated and scaled image of the input point $(X_0,Y_0)$. In other words, the resultant point $(X_R,Y_R)$ is that point which arises from rotating the input point $(X_0,Y_0)$ by input angle $\lambda_0$ and then radially extending the interim rotated point by factor K. One advantage of the CORDIC algorithm lies in the fact that it implements this scaled rotation more efficiently than a direct computation of equations (1) and (2) which would generally require a pair of hardware multiplies and trigonometric evaluations.

Suppose that the input point $(X_0,Y_0)$ is chosen to be (1/K,0). In this case, the initial radius $R_0$ equals 1/K and the angle $\theta_0$ of the input point with respect to the positive x axis equals zero. According to equations (1) and (2), after N iterations of the CORDIC algorithm, the x-coordinate $X_N$ approximates the value $\cos(\lambda_0)$, and the y-coordinate $Y_N$ approximates the value $\sin(\lambda_0)$. By various arrangements of the initial conditions and the structure of the CORDIC algorithm, a great variety of elementary functions may be evaluated.

The CORDIC algorithm operates on the input point $(X_0,Y_0)$ and the input angle $\lambda_0$ by applying an iterative series of pseudo-rotations governed by the following system of equations:

$$Y_{i+1}=Y_i+\xi_i 2^{-i}X_i \qquad (3)$$

$$X_{i+1}=X_i-\xi_i 2^{-i}Y_i \qquad (4)$$

$$\lambda_{i+1}=\lambda_i-\xi_i \alpha_i, \qquad (5)$$

$$\alpha_i=\arctan(2^{-i}), \qquad (6)$$

where the iteration index i is greater than or equal to zero, and where the scalar factor $\xi_i$ takes the value ±1 depending on the sign of the residual angle $\lambda_i$. In particular, if the residual angle $\lambda_i$ is positive, the factor $\xi_i$ takes the value +1, and thus, equations (6) and (7) implement a pseudo-rotation of the intermediate point $(X_i,Y_i)$ by the angle $\alpha_i$, and equation (8) computes an updated residual angle $_{80\ i+1}$ by subtracting the angle $\alpha_i$ from the current residual $\lambda_i$. Conversely, if the residual angle $\lambda_i$ is negative, the factor $\xi_i$ takes the value −1, and thus, equations (6) and (7) implement a pseudo-rotation of the intermediate point $(X_i,Y_i)$ by the angle $-\alpha_i$, and equation (8) computes the updated residual by adding the angle $\alpha_i$ to the current residual.

It is noted that equations (6) and (7) implement a pseudo-rotation of the point $(X_i,Y_i)$ by the rotation angle $\alpha_i$. The direction of the pseudo-rotation (clockwise or counter-clockwise) depends on the value of factor $\xi_i$. The resultant point $(X_{i+1},Y_{i+1})$ may be equivalently expressed by the relations $$Y_{i+1}=\sqrt{1+2^{-2i}}R_i \sin(\theta_i+\xi_i\alpha_i), \qquad (7)$$

$$X_{i+1}=\sqrt{1+2^{-2i}}R_i \cos(\theta_i+\xi_i\alpha_i), \qquad (8)$$

where $R_i$ is the radius of the point $(X_i,Y_i)$, and $\theta_i$ is the angle of the point $(X_i,Y_i)$ with respect to the positive x axis, i.e.

$$Y_i=R_i \sin(\theta_i), \qquad (9)$$

$$X_i=R_i \cos(\theta_i). \qquad (10)$$

The resultant point $(X_{i+1},Y_{i+1})$ is slightly farther from the origin than the source point $(X_i,Y_i)$, i.e. by a factor of $\sqrt{1+2^{-2i}}$, and for this reason the resultant point cannot be said to be a pure rotation of the source point.

As the iteration index i increases, the intermediate point $(X_i,Y_i)$ converges to the limiting resultant point given by equations (1) and (2). Furthermore, the residual angle $\lambda_i$ converges to zero. It can be shown that the CORDIC algorithm exhibits an exponential rate of convergence, i.e. after N iterations of the CORDIC algorithm the residual angle $\lambda_N$ has an absolute value smaller than $2^{-(N-1)}$. In addition, the coordinates of the intermediate point $(X_N,Y_N)$ approximate the corresponding coordinates of the limiting resultant $(X_R,Y_R)$ to within a tolerance of $KR_0 2^{-(N-1)}$. In other words, each iteration of the CORDIC algorithm yields an additional bit of precision in the binary representations of $X_N$ and $Y_N$.

Iteration equations (6), (7) and (8) may be efficiently implemented with (a) shifters configured to perform the indicated multiplications by powers of two, (b) adders configured to perform the addition and subtraction operations, and (c) a comparator to test the residual value for controlling the conditional additions and subtractions. In particular, it is noted that the iteration equations (6), (7) and (8) may be evaluated without performing hardware multiplies or trigonometric evaluations. The angular constants a, may be stored in a lookup table. These features allow the CORDIC algorithm to compute approximations to $X_R$ and $Y_R$ in significantly less time than direct implementations of equations (1) and (2) which achieve a comparable precision.

It is noted that multiplication of a binary number by ½ corresponds to shifting the bits of the binary number to the right one position with respect the binary point. In general, multiplication of a binary number by the factor $2^{-L}$ corresponds to shifting the bits of the binary number to the right L bit positions.

Various ways to improve the CORDIC algorithm have been sought. One prior art method for improving the CORDIC algorithm has been advanced by Timmermann et al. in a paper entitled "Modified CORDIC Algorithm with Reduced Iterations", Electronic Letters, vol. 25, no.15, pages 950–951, copyright 1989, which is hereby incorporated by reference in its entirety. Timmermann et al. make the observation that the first iterations of the CORDIC algorithm make the most significant contributions since the rotation angles $\alpha_i$ decrease with increasing iteration index i. The last iterations each contribute one additional bit of precision to the resultant values. Thus, an initial number J of CORDIC iterations may be performed, and the remaining number (N+1−J) of CORDIC iterations which would normally be required to achieve N bits of precision may be replaced by a single rotation step. If the number J is appropriately chosen the residual angle $\lambda_J$ will be sufficiently close to zero so that $$|\cos(\lambda_J)-1|<2^{-N}. \tag{11}$$

In particular, it can be shown that inequality (11) will be satisfied if $$J > \frac{N+1}{2}.$$

For example, integer J may be set equal to the smallest integer greater than or equal to $$\frac{N+1}{2}.$$

The intermediate point $(X_J, Y_J)$ resulting from the $J^{th}$ CORDIC iteration may be rotated through the residual angle $\lambda_J$ using the relations $$Y_T = \lambda_J X_J + Y_J, \tag{12}$$

$$X_T = X_J - \lambda_J Y_J, \tag{13}$$

where the sine and cosine of $\lambda_J$ are replaced by $\lambda_J$ and 1 respectively. The output point $(X_T, Y_T)$ approximates the point given by $(K_J R_0 \cos(\theta_0 + \lambda_0), K_J R_0 \sin(\theta_0 + \lambda_0))$ with N bits of precision, where $$K_J = \sqrt{1+2^{-2(0)}}\sqrt{1+2^{-2(1)}} \ldots \sqrt{1+2^{-2(J-1)}}. \tag{14}$$

If the rotation step given by equations (12) and (13) are implemented with a latency smaller than the latency of (N+1−J) CORDIC stages, the rotation step may advantageously replace computation of the last (N+1−J) CORDIC stages of the standard CORDIC algorithm. This procedure of performing J CORDIC iterations, where $$J > \frac{N+1}{2},$$

followed by the rotation step of equations (12) and (13) will be referred to herein as the Timmermann algorithm.

The Timmermann algorithm uses small angle approximations for sine and cosine which induce error in the resultant point $(X_T, Y_T)$. To control this error, the Timmermann algorithm is forced to use a large number of CORDIC stages $$\left(\text{i.e. } J > \frac{N+1}{2}\right).$$

The sine and cosine are replaced with their small angle approximations because evaluation of these functions even for small angles according to prior art techniques generally requires an inordinately large time delay. Thus, there exists a need for a fast and accurate mechanism for evaluating the cosine and/or sine functions on small angles.

The CORDIC algorithm and the Timmermann algorithm have gained a wide field of application due to their computational efficiency. Thus, any improvements to the CORDIC algorithm, especially improvements which exceed the speed and performance of the Timmermann algorithm, are highly desirable.

The cosine function finds use in many and various fields of engineering and scientific endeavor. For example; in the Timmermann algorithm described above, the cosine function is replaced by its small angle approximation, i.e. cos$(\theta) \approx 1$. This approximation and others are quite typically used in an effort to avoid the computational burden of evaluating a Taylor series for cosine, or the time delay of accessing a lookup table. Thus, any technique or mechanism for increasing the speed of a cosine function evaluation is profoundly desirable, and would result in significant improvements in algorithms which rely heavily on cosine computations.

SUMMARY OF THE INVENTION

A cosine computation unit according to the present invention comprises a logical processing unit and an addition unit. The logical processing unit comprises an input bus with a plurality of input lines for receiving an input angle value. The logical processing unit includes a first plurality of gates, preferably AND gates, coupled to the input bus. Each gate of the first plurality of gates couples to two or more of the input lines. The logical processing unit generates N output operands on N corresponding output buses. At least one of the output buses includes (a) at least one output line coupled to an output of one of the first plurality of gates, and (b) at least one output line coupled to one of the input lines of the input bus. The number N of output buses is greater than or equal to two.

The addition unit couples to the N output buses of the logical processing unit, and is configured to perform an addition of the N binary operands provided on the N output buses. The addition unit generates a resultant number which represents the cosine of the input operand conveyed on the input bus.

In one embodiment of the logical processing unit, each of the output buses comprises (a) one or more output lines which are driven by corresponding gates of the first plurality of gates and (b) one or more additional output lines each of which is set equal to a logical zero value.

The cosine computation unit operates under the assumption that a leading number of the most significant bits of the input operands are equal to zero. Such a situation arises in the CORDIC algorithms. After a succession of CORDIC stages/iterations, the residual angle from the last CORDIC stage is guaranteed to have a leading number of zeros which depends on the number of CORDIC stages in the succession.

BRIEF DESCRIPTION OF THE DRAWINGS

Other objects and advantages of the invention will become apparent upon reading the following detailed description and upon reference to the accompanying drawings in which:

FIG. 6 illustrates one embodiment of a conditional add/subtract operation unit 610 which may be used in X/Y cell 402-k and/or a portion of Z cell 403-k;

FIG. 7 illustrates one embodiment of a method for evaluating a function in a microprocessor using a succession of M CORDIC iterations;

FIG. 11B presents the format of the input angle operand Z to the logical processing unit embodied in FIG. 11A;

FIG. 11C is a table which described the input-output relationship of the logical processing unit embodied in FIG. 11A;

FIG. 12A presents the format of the input angle operand Z for a second embodiment of logical processing unit 1020;

FIG. 12B is a table of the input-output relation of the second embodiment of logical processing unit 1020.

Figure 1A:
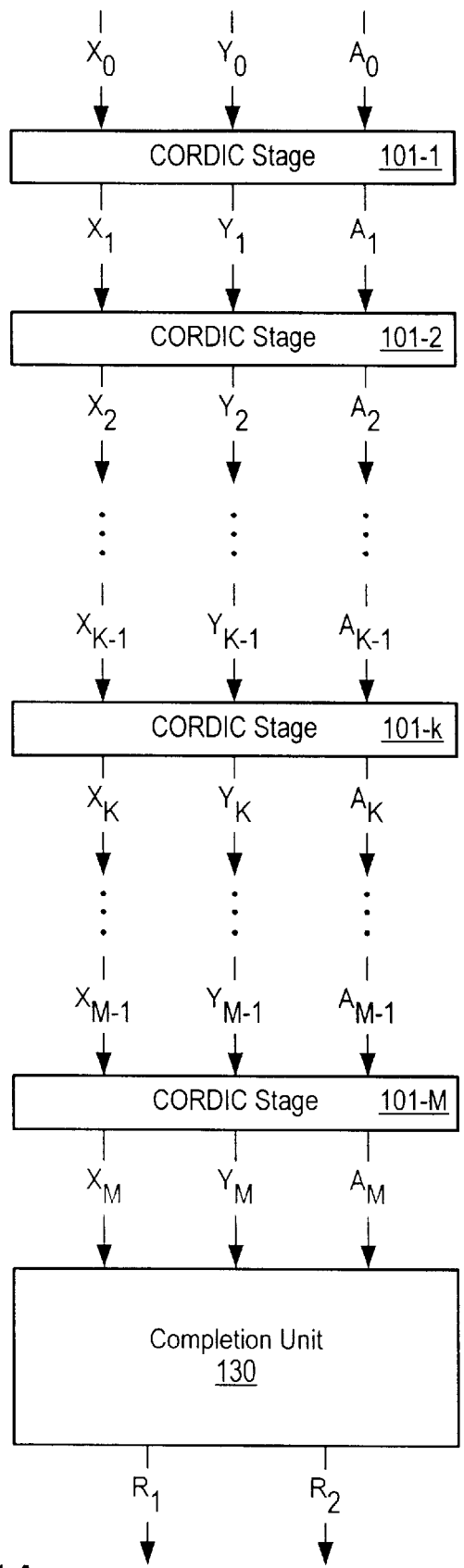
FIG. 1A illustrates one embodiment of a function evaluation system according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

FIG. 1A illustrates one embodiment of a function evaluation system according to the present invention. The embodiment of FIG. 1A may comprise a succession of CORDIC hardware stages 101-1 through 101-M followed by completion unit 130. The first CORDIC stage 101-1 may receive an input point $(X_0, Y_0)$ and an input angle $A_0$. Thus, the first CORDIC stage 101-1 may have three input buses, i.e. one input bus for each of the input arguments $X_0$, $Y_0$ and $A_0$. The generic CORDIC stage 101-k which represents any of CORDIC stages 101-1 through 101-M may receive a point $(X_{k-1}, Y_{k-1})$ and a residual angle $A_{k-1}$ from the previous stage, and generate an updated point $(X_k, Y_k)$ and an updated residual angle $A_k$ according to the equations $$Y_k = Y_{k-1} + \xi_{k-1} 2^{-(k-1)} X_{k-1} \tag{15}$$

$$X_k = X_{k-1} - \xi_{k-1} 2^{-(k-1)} Y_{k-1} \tag{16}$$

$$A_k = A_{k-1} - \xi_{k-1} \cdot \alpha_{k-1}, \tag{17}$$

$$\alpha_{k-1} = \arctan(2^{-(k-1)}), \tag{18}$$

where the scalar factor $\xi_{k-1}$ takes the value $\pm 1$ depending on the sign of the residual angle $A_{k-1}$. In particular, if the residual angle $A_{k-1}$ is positive, the factor $\xi_{k-1}$ takes the value +1, and thus, equations (15) and (16) implement a pseudo-rotation of the intermediate point $(X_{k-1}, Y_{k-1})$ by the angle $\alpha_{k-1}$, and equation (17) computes the updated residual angle $A_k$ by subtracting the angle $\alpha_{k-1}$ from the current residual $A_{k-1}$. Conversely, if the residual angle $A_{k-1}$ is negative, the factor $\xi_{k-1}$ takes the value $-1$, and thus, equations (15) and (16) implement a pseudo-rotation of the intermediate point $(X_{k-1}, Y_{k-1})$ by the angle $-\alpha_{k-1}$, and equation (17) computes the updated residual angle by adding the angle $\alpha_{k-1}$ to the current residual angle. The last CORDIC stage 101-M generates an output point $(X_M, Y_M)$ and an output angle value $A_M$. Thus, last CORDIC stage 101-M may include three output buses, i.e. one bus for each of the output values $X_M$, $Y_M$ and $A_M$.

Figure 1B:
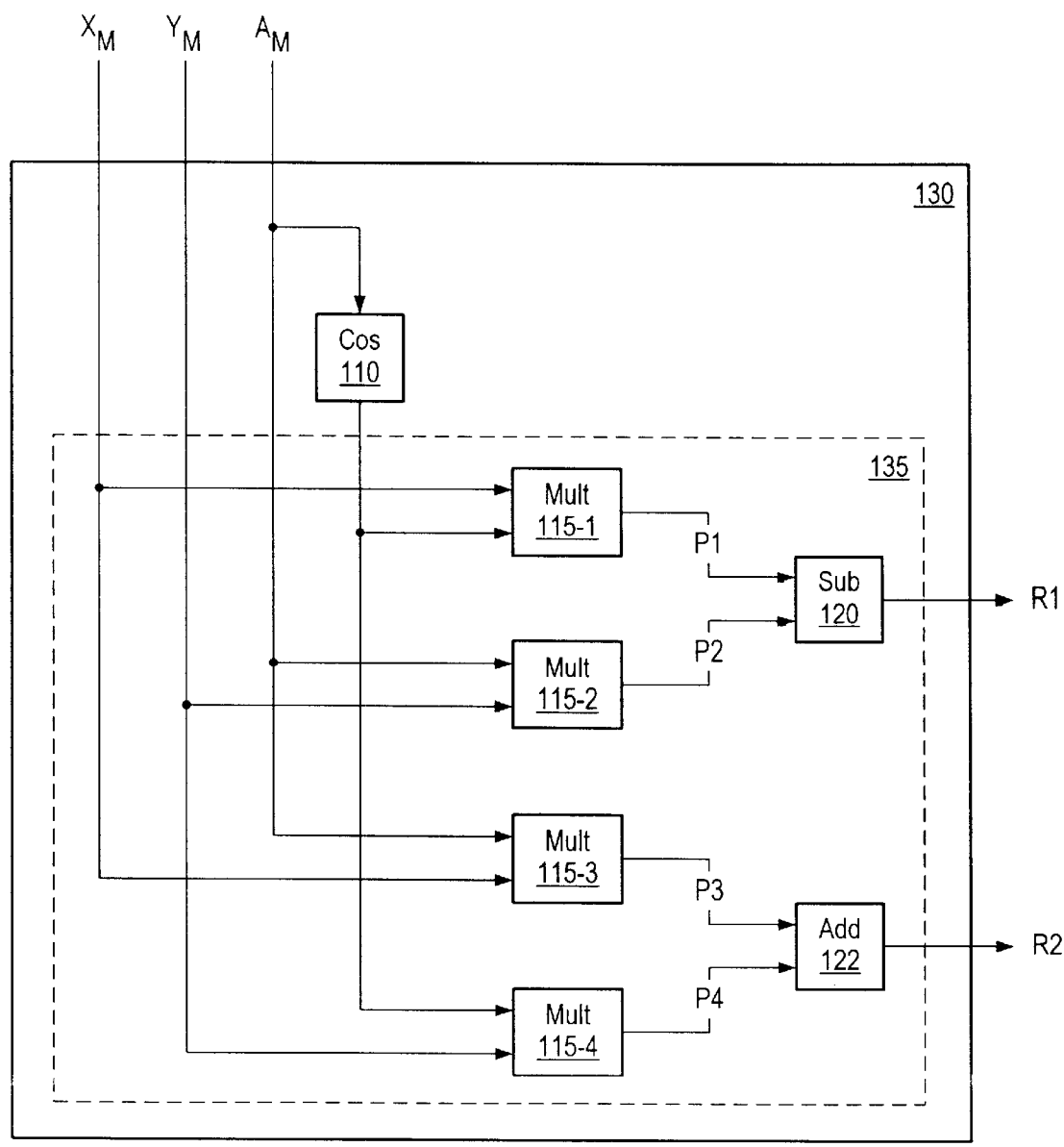
FIG. 1B illustrates one embodiment of completion unit 130 according to the present invention.

Completion unit 130 may couple to the last CORDIC stage 101-M through output buses $X_M$, $Y_M$ and $A_M$. Completion unit 130 is configured to operate on the output point $(X_M, Y_M)$ and an output angle value $A_M$ in order to generate a first resultant $R_1$ which represents the evaluation of a function. As shown in FIG. 1B, completion unit 130 comprises cosine computation unit 110 and vector operation unit 135. Vector operation unit 135 comprises multiplication units 115-1 through 115-4, subtraction unit 120, and addition unit 122.

Cosine computation unit 110 may be coupled to receive the output angle $A_M$ from the last CORDIC stage 101-M, and configured to compute the cosine of the output angle $A_M$. In several embodiments, cosine unit 110 employs a special hardware structure according to the present invention for computing the cosine of angle $A_M$. In alternative embodiments, cosine unit 110 employs any known prior art method for computing the cosine.

Multiplication unit 115-1 may be coupled to the cosine computation unit 110 and further coupled to receive the first coordinate $X_M$ of the output point from the last CORDIC stage 101-M. Multiplication unit 115-1 may be configured to multiply the cosine value, i.e. the output of the cosine computation unit 110, by the first coordinate $X_M$ to generate a first product P1.

Multiplication unit 115-2 may be coupled to receive the output angle value $A_M$ from the last CORDIC stage 101-M, and further coupled to receive the second coordinate $Y_M$ of the output point from the last CORDIC stage. Multiplication unit 115-2 may be configured to multiply the output angle value $A_M$ by the second coordinate $Y_M$ to generate a second product P2. Subtraction unit 120 may be coupled to receive the first product P1 and second product P2 from multiplications unit 115-1 and 115-2 respectively, and configured to subtract the second product P2 from the first product P1 in order to generate the first resultant value R1. It is noted that in the preferred embodiment of subtraction unit 120, subtraction unit 120 includes an adder and a negation unit (not shown). The second product P2 is negated by the negation unit prior to presentation to the adder.

Multiplication unit 115-3 may be coupled to receive the first coordinate $X_M$ of the output point from the last CORDIC stage 101-M, and further coupled to receive the output angle $A_M$ from the last CORDIC stage 101-M. Multiplication unit 115-3 may be configured to multiply the first coordinate $X_M$ and the output angle $A_M$ in order to generate a third product P3.

Multiplication unit 115-4 may be coupled to receive the second coordinate $Y_M$ of the output point from the last CORDIC stage 101-M, and further coupled to receive the cosine value generated by the cosine computation unit 110. Multiplication unit 115-4 may be configured to multiply the second coordinate $Y_M$ and the cosine value in order to generate a fourth product P4.

Addition unit 122 may be coupled to receive third product P3 and fourth product P4 from multiplication units 115-3 and 115-4 respectively. Addition unit 112 may be configured to add the third product P3 and the fourth product P4 in order generate a second resultant value R2.

In summary, completion unit 130 performs a computation which rotates the output point $(X_M, Y_M)$ by output angle $A_M$ in accordance with the equations $$R1 = \cos(A_M) \cdot X_M - A_M \cdot Y_M, \quad (19)$$

$$R2 = A_M \cdot X_M + \cos(A_M) \cdot Y_M. \quad (20)$$

First resultant value R1 represents the evaluation of a first function of the input angle $A_0$ and/or the input coordinates $X_0$ and $Y_0$. For example, the first resultant value R1 may represent the cosine the input angle $A_0$. The second resultant value R2 may represents the evaluation of a second function of the input angle $A_0$ and/or the input coordinates $X_0$ and $Y_0$. The first function and the second function may be trigonometric functions, inverse trigonometric functions, hyperbolic functions, inverse hyperbolic functions, exponential functions, logarithmic functions, a root-sum-square function, or a combination thereof. A root-sum-square function is a function that performs the computation $\sqrt{X_0^2 + Y_0^2}$. Thus, the root-sum-square function may be used to determine the magnitude of the input point $(X_0, Y_0)$.

The function evaluation system according to the present invention may advantageously achieve N bit precision using significantly fewer CORDIC stages fian prior art CORDIC algorithms such as the Timmermann algorithm. It can be shown that a pure CORDIC algorithm requires approximately (N+1) CORDIC stages to achieve N bit precision. Furthermore, the Timmermann algorithm requires at least (N+1)/2 CORDIC iterations to achieve N bit precision. To achieve N bit precision in the resultant values R1 and R2, the function evaluation system of FIG. 1 may use M CORDIC stages, where $$M > \frac{1}{3} \cdot [N + 2 - \log_2(3)] \approx \frac{N+1}{3}. \quad (LB)$$

This lower bound on the number M of CORDIC stages arises by imposing the constraint that $$|\sin(A_M) - A_M| < 2^{-N}. \quad (21)$$

Since the function evaluation system of the present invention uses fewer CORDIC stages, the resultant values R1 and R2 may be computed with lower latency that prior art CORDIC algorithms such as the Timmermann algorithm.

In various embodiments, the number M of CORDIC stages takes any integer value which greater than or equal to the lower bound (LB) and less than (N+1)/2, where N is the bit precision of the resultant values R1 and R2.

The Taylor series expansions for the sine and cosine functions imply that $$|\sin(A_M) - A_M| < \tfrac{1}{6} A_M^3, \quad (22)$$

$$|\cos(A_M) - 1| < \tfrac{1}{2} A_M^2. \quad (23)$$

This may be equivalently expressed as follows. As angle $A_M$ approaches zero, the sine of $A_M$ approaches $A_M$ faster than the cosine of $A_M$ approaches one. Thus, constraint (21) does not automatically imply that $$|\cos(A_M) - 1| < 2^{-N}. \quad (24)$$

In order to ensure the N bit precision of the resultants R1 and R2, the completion unit 130 according to the present invention does not use the small angle approximation for cosine, i.e. $\cos(A_M) \approx 1$. In particular, cosine unit 110 computes the cosine of angle $A_M$.

In the preferred embodiment of CORDIC stages 101-1 through 101-M, the multiplications by $2^{-k}$ indicated in equations (15) and (16) may be implemented by the physical wiring of conductors. It is well known that the multiplication of a binary number by a power of two may be implemented by shifting the bits of the binary number. Shifting all the bits of the binary number to the right a distance of k bits corresponds to a multiplication by $2^{-k}$.

Figure 2A:
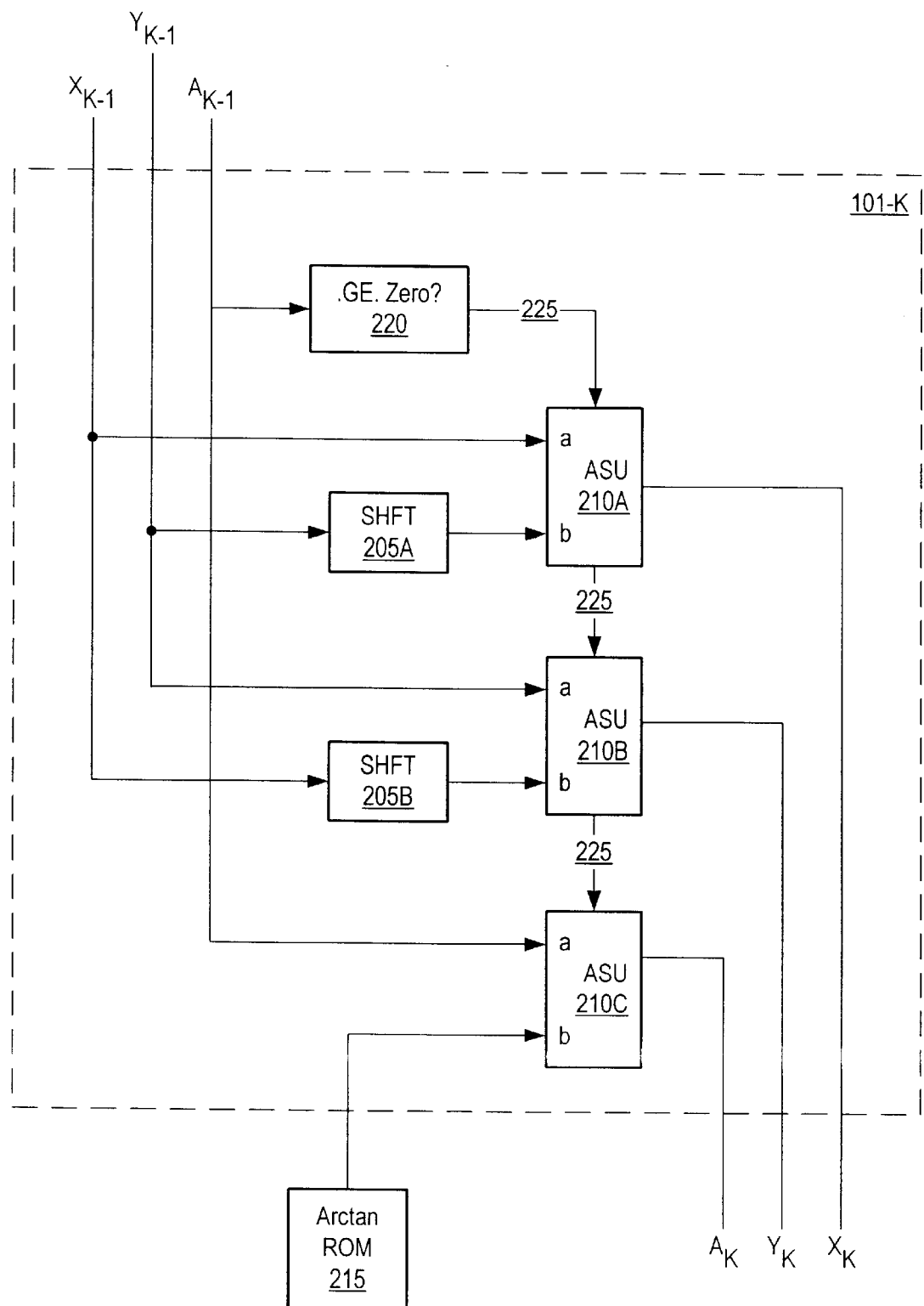
FIG. 2A illustrates one embodiment of generic CORDIC stage 101-k according to the present invention.

FIG. 2A presents one embodiment of generic CORDIC stage 101-k comprising add/subtract units 210A through 210C, shifters 205A and 205B, and zero comparator 220. Generic CORDIC stage 101-k is coupled to a previous CORDIC stage (not shown) from which it receives input values $X_{k-1}$, $Y_{k-1}$ and $A_{k-1}$. Generic CORDIC stage 101-k implements the computations described by equations (15), (16), and (17). Each of the add/subtract units 210A–210C performs either an addition or subtraction conditioned on the state of arithmetic control signal 225 generated by zero comparator 220. Zero comparator 220 compares input angle $A_{k-1}$ to zero. If the input angle $A_{k-1}$ is greater than or equal to zero, zero comparator drives arithmetic control signal 225 to a first state which indicates that add/subtract units 210A–210C are to perform subtraction, addition, and subtraction respectively. If the input angle $A_{k-1}$ is less than zero, zero comparator drives the arithmetic control 225 to a second state which indicates that add/subtract units 210A–210C are to perform addition, subtraction, and addition respectively. In cases where subtraction is performed, the value at the b input is subtracted from the value appearing at the a input.

Figure 2B:
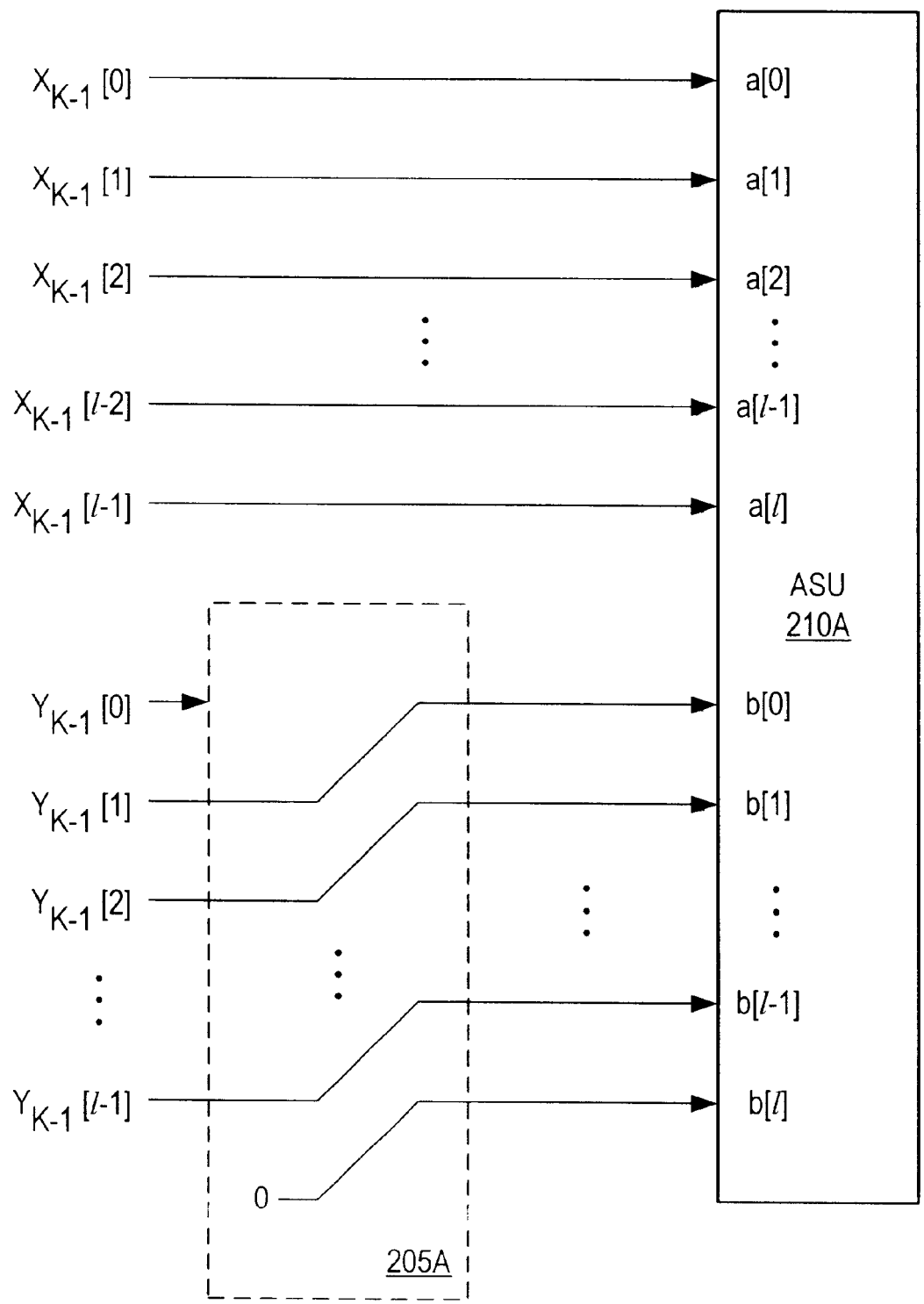
FIG. 2B illustrate one embodiment of shifter 205A according to the present invention.

Shifters 205A and 205B implement the multiplication by $2^{-k}$ as indicated by equations (15) and (16). In the preferred embodiment, shifters 205A and 205B are realized by physical conductive pathways and their pattern of connectivity between the output of one device and the input of another device. For example, in FIG. 2B shifter 205A realizes an automatic multiplication by ½ by virtue of the connectivity of signal pathways. Input value $Y_{k-1}$ is supplied to shifter 205A on signal lines $Y_{k-1}[0]$ through $Y_{k-1}[l-1]$. Input b to add/subtract unit 210A comprises input lines b[0] through b[l-1]. In the embodiment of FIG. 2B, shifter 205A represents the shifted pattern of connectivity between the lines comprising input value $Y_{k-1}$ and the input lines comprising input b. This pattern of connectivity may be summarized by the equation $Y_{k-1}[j]=b[j-k]$, where j ranges from k to l−1. Signal lines $Y_{k-1}[0]$ through $Y_{k-1}[k-1]$ are terminated, and input lines $b[l-k]$ to $b[l-1]$ are supplied with zeroes. In this fashion, a shift operation may be performed on the input value $Y_{k-1}$ without additional gate delays. Input value $X_{k-1}$ comprises signal lines $X_{k-1}[0]$ through $X_{k-1}[l-1]$. Furthermore input a of add/subtract unit 210A comprises input lines a[0] through a[l−1]. Signal lines $X_{k-1}[j]$ are supplied directly to their corresponding input lines a[j] without shifting.

Add/subtract unit 210A adds or subtracts the values $X_{-1}$ and $2^{-k}Y_{-1}$ in response to the state of arithmetic control signal 225. The output of add/subtract unit 210A comprises the updated x-coordinate value $X_k$. Similarly, add/subtract unit 210B receives input value $Y_{k-1}$ from the previous CORDIC stage and product value $2^{-k}X_{k-1}$ from shifter 205B, and adds or subtracts these values in response to the state of arithmetic control signal 225. The output of add/subtract unit 210B comprises the updated y-coordinate value $Y_k$.

Add/subtract unit 210C is coupled to receive the angle value $A_{k-1}$ from the previous CORDIC stage and arctan coefficient $\alpha_{k-1}$ from Arctan ROM 215. Arctan ROM 215 stores the value of the arctan coefficients $\alpha_0$ through $\alpha_{M-1}$. The arctan coefficient $\alpha_{k-1}$ may be supplied continually to input b of add/subtract unit 210C since its value never changes. In this fashion, no time delay is induced in order to access the arctan coefficients. Add/subtract unit 210C adds or subtracts the angle value $A_{k-1}$ and the arctan coefficient $\alpha_{k-1}$ in response to arithmetic control signal 225. The output of add/subtract unit 210C comprises the updated angle value $A_{k-1}$.

It is noted that the propagation delay of generic CORDIC stage 101-k equals the sum of delays associated with zero comparator 220 and an add/subtract unit (i.e. the longest of the delays associated with add/subtract units 210A through 210C). The succession of CORDIC stages 101-1 through 101-M depicted in FIG. 1A is said to be unfolded. CORDIC stages 101-1 through 101-M and completion unit 130 may be configured for pipelined computation on a stream of input points $(X_0(j),Y_0(j))$ including the input point $(X_0,Y_0)$ and a stream of angle values $A_0(j)$ including the input angle value $A_0$.

In one embodiment, the function evaluation system of FIG. 1A operates as an input-output device, i.e. an input point $(X_0,Y_0)$ and an input angle $A_0$ is presented and the resultant values R1 and R2 are produced before presentation of a new input point and a new input angle.

In one embodiment of CORDIC stages 101-1 through 101-M of FIG. 1, generic CORDIC stage 101-k generates coordinates $X_k$ and $Y_k$ at the same time as angle value $A_k$. Thus, last CORDIC stage 101-M generates output point $(X_M,Y_M)$ at the same time as output angle $A_M$.

Figure 3A:
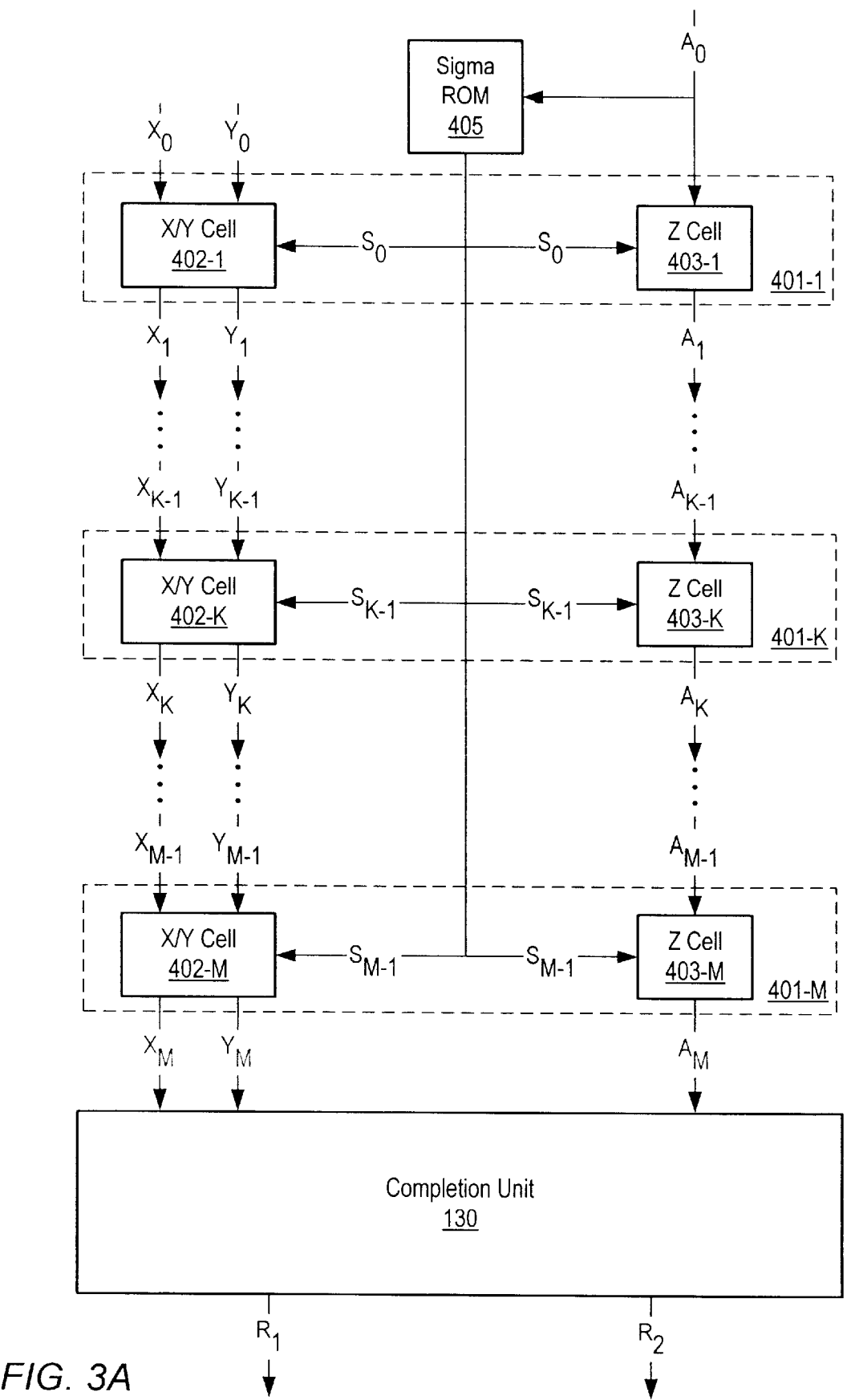
FIG. 3A illustrates a second embodiment of a function evaluation system according to the present invention.

FIG. 3A illustrates another embodiment of a function evaluation system according to the present invention. The embodiment of FIG. 3A comprises M CORDIC stages labeled 401-1 through 401-M, Sigma ROM 405, and completion unit 130. Generic CORDIC stage 401-k is meant to represent any of CORDIC stages 401-1 through 401-M. Generic CORDIC stage 401-k comprises X/Y cell 402-K and Z cell 403-k. Z cell 403-k performs the computation given by equation (17) above. X/Y cell 402-k performs the computations given by equations (15) and (16) preferably in parallel. The number M of CORDIC stages again satisfies the inequality $M > \frac{1}{3} \cdot [N+2-\log_2(3)]$.

In the preferred embodiment, Z cells 403-k are implemented with lower propagation delay (i.e. latency) than X/Y cells 402-k. Thus, output angle $A_M$ becomes available significantly earlier than output values $X_M$ and $Y_M$. In fact, as soon as output angle $A_M$ becomes available at the output of last Z cell 403-M, the output angle $A_M$ may be provided to cosine computation unit 110. Cosine computation unit 110 may be able to compute the cosine of output angle $A_M$ before output values $X_M$ and $Y_M$ become available at the output of last X/Y cell 402-M. Therefore, completion unit 130 may perform the multiplications indicated by multiplication units 115-1 through 115-4 as soon as the output values $X_M$ and $Y_M$ become available.

Sigma ROM 405 stores sets of arithmetic control values $(S_0, S_1, \ldots, S_{M-1})$ which control the addition/subtraction behavior of the CORDIC stages 401-1 through 401-M. Sigma ROM 405 selects one of the sets $(S_0, S_1, \ldots, S_{M-1})$ in response to receiving the input angle $A_0$. The arithmetic control values $S_j$ in the selected set are provided to corresponding CORDIC stages. In particular, arithmetic control value $S_{k-1}$ is provided to X/Y cell 402-k and Z cell 403-k. Arithmetic control value $S_{k-1}$ is synonymous with control value $\xi_{k-1}$ discussed in connection with equations (15) through (16) above. However, the sets of arithmetic control values $(S_0, S_1, \ldots, S_{M-1})$ are precomputed for a large collection of possible values of input angle $A_0$, and stored in Sigma ROM 405. Therefore, CORDIC stages 401-1 through 401-M may advantageously eliminate hardware for real-time testing of intermediate angle values $A_k$ with respect to zero. Thus, the latency of X/Y cell 402-k is reduced to the latency of an addition or subtraction operation. Similarly, the latency of Z cell 403-k is reduced to the latency of an addition or subtraction operation.

Figure 3B:
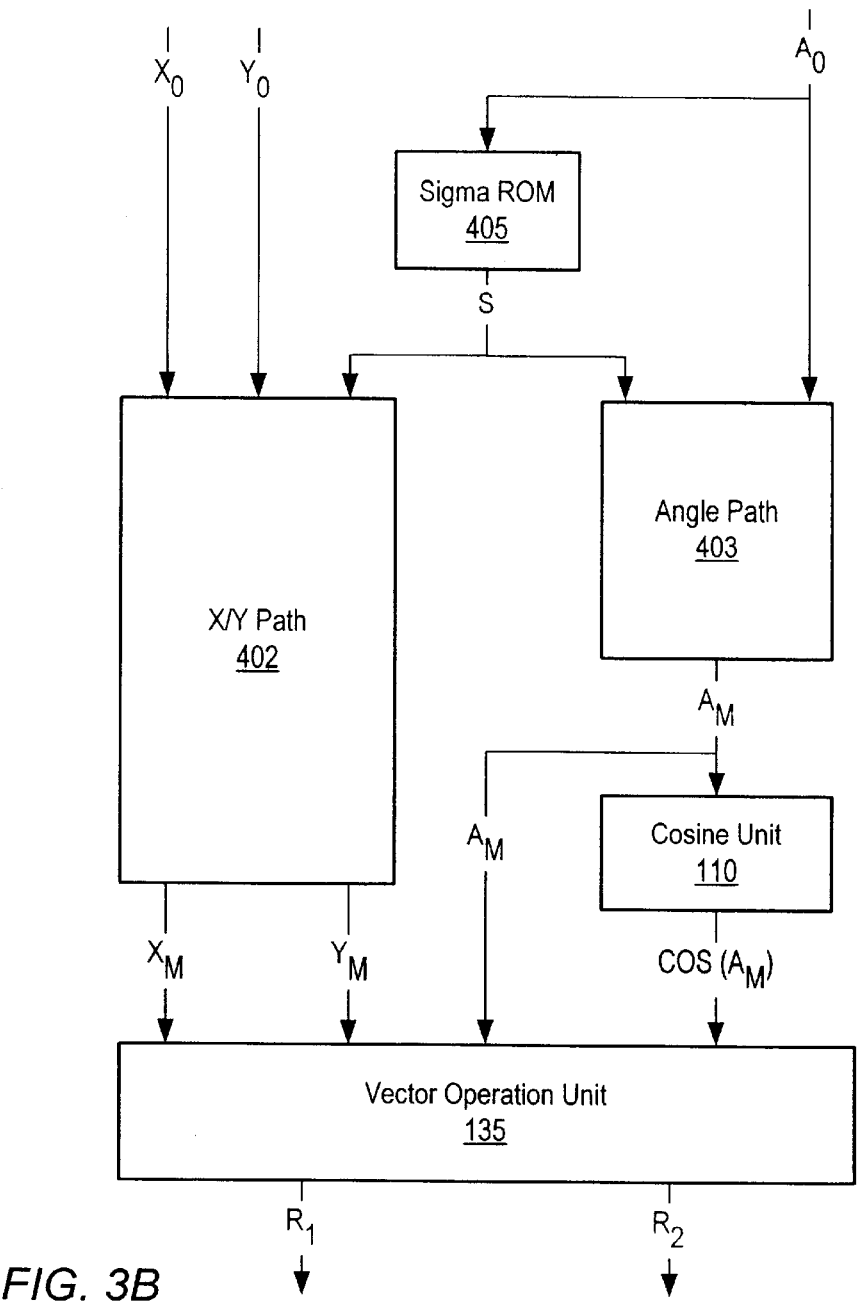
FIG. 3B illustrates the preferred timing relationships of processing operations in the embodiment of FIG. 3A.

FIG. 3B shows a conceptualized view of the embodiment of FIG. 3A which illustrates some of the timing relationships between various computational blocks. X/Y path 402 comprises X/Y cells 402-1 through 402-M taken together. Angle path 403 comprises Z cells 403-1 through 403-M taken together. Sigma ROM accesses a set S of arithmetic control values in response to receiving the input angle value $A_0$, and provides the set S to X/Y path 402 and Angle Path 403. Angle path 403 is also referred to herein as Z path 403. The input values $X_0$ and $Y_0$ are provided to X/Y Path 402, and input angle $A_0$ is provided to angle path 403.

Angle path 403 is depicted with a smaller vertical height than the X/Y Path 402 to indicate that output angle $A_M$ is generated by Angle path 403 at a time substantially earlier than X/Y path 402 generates output values $X_M$ and $Y_M$. Cosine unit 110 is depicted as having a lower edge with higher elevation than the lower edge of X/Y path 402 to indicate that cosine unit 110 may complete computation of the $\cos(A_M)$ before output values $X_M$ and $Y_M$ become available from X/Y path 402. Thus, vector operation unit 135 may initiate the computation of resultant values R1 and R2 as soon as output values $X_M$ and $Y_M$ become available. It is noted that the pre-computed set S of arithmetic control values provided by Sigma ROM 405 allow the X/Y path 402 and Angle path 403 to operate independently.

The total propagation time of the function evaluation system of FIG. 3A may be given by the expression $T_{rom} + MT_{x/y} + T_{mult} + T_{add/sub}$ if the cosine computation unit 110 has propagation time $T_{cos}$ less than or equal to time differential $M(T_{x/y} - T_z)$, where M is the number of CORDIC stages, $T_{rom}$ is the memory access time for Sigma ROM 405, $T_{mult}$ unit is the maximum of the propagation times of multiplication units 115-1 through 115-4, and $T_{add/sub}$ is the maximum of the propagation times of subtraction unit 120 and addition unit 122. The propagation time of the function evaluation system may be defined as the time delay between presentation of the input data, i.e. input point $(X_0, Y_0)$ and input angle $A_0$, and generation of the resultant values R1 and R2. If the cosine computation unit propagation time $T_{cos}$ is greater than time differential $M(T_{x/y} - T_z)$, then the total propagation time of the function evaluation system of FIG. 3A may be given by the expression $T_{rom} + T_{cos} + MT_z + T_{mult} + T_{add/sub}$. Because the cosine computation unit 110 may begin its computation before the output coordinates $X_M$ and $Y_M$ are generated by X/Y-cell 402-M, the function evaluation system of FIG. 3A may have a smaller total propagation time than embodiments of FIG. 1 which constrain CORDIC stages to produce angle updates and x/y coordinate updates simultaneously.

Figure 4A:
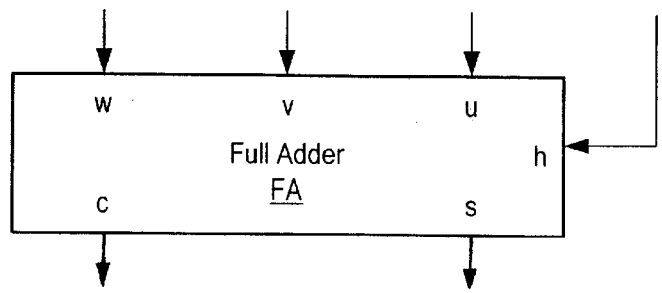
FIG. 4A illustrates the input and output lines of a full adder.

FIG. 4A illustrates one embodiment of a full adder FA according to the present invention. Full adder FA includes three single-bit inputs u, v and w, a control input h, and two single-bit outputs—i.e. carry bit c and save bit s. The following tables summarize the input-output relationship of full adder FA.

TABLE 1

Control Input h Indicates Addition

| w | v | u | c | s |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

TABLE 2

Control Input h Indicates Subtraction

| w | v | u | c | s |
|---|---|---|---|---|
| 0 | 0 | 0 | 0 | 0 |
| 0 | 0 | 1 | 1 | 1 |
| 0 | 1 | 0 | 0 | 1 |
| 0 | 1 | 1 | 0 | 0 |
| 1 | 0 | 0 | 1 | 1 |
| 1 | 0 | 1 | 1 | 0 |
| 1 | 1 | 0 | 0 | 0 |
| 1 | 1 | 1 | 1 | 1 |

When control input h indicates that addition is to be performed, the full adder FA operates as shown in Table 1 above. However, when control input h indicates that subtraction is to be performed, full adder FA has an input-output relation given by table 2.

Figure 4B:
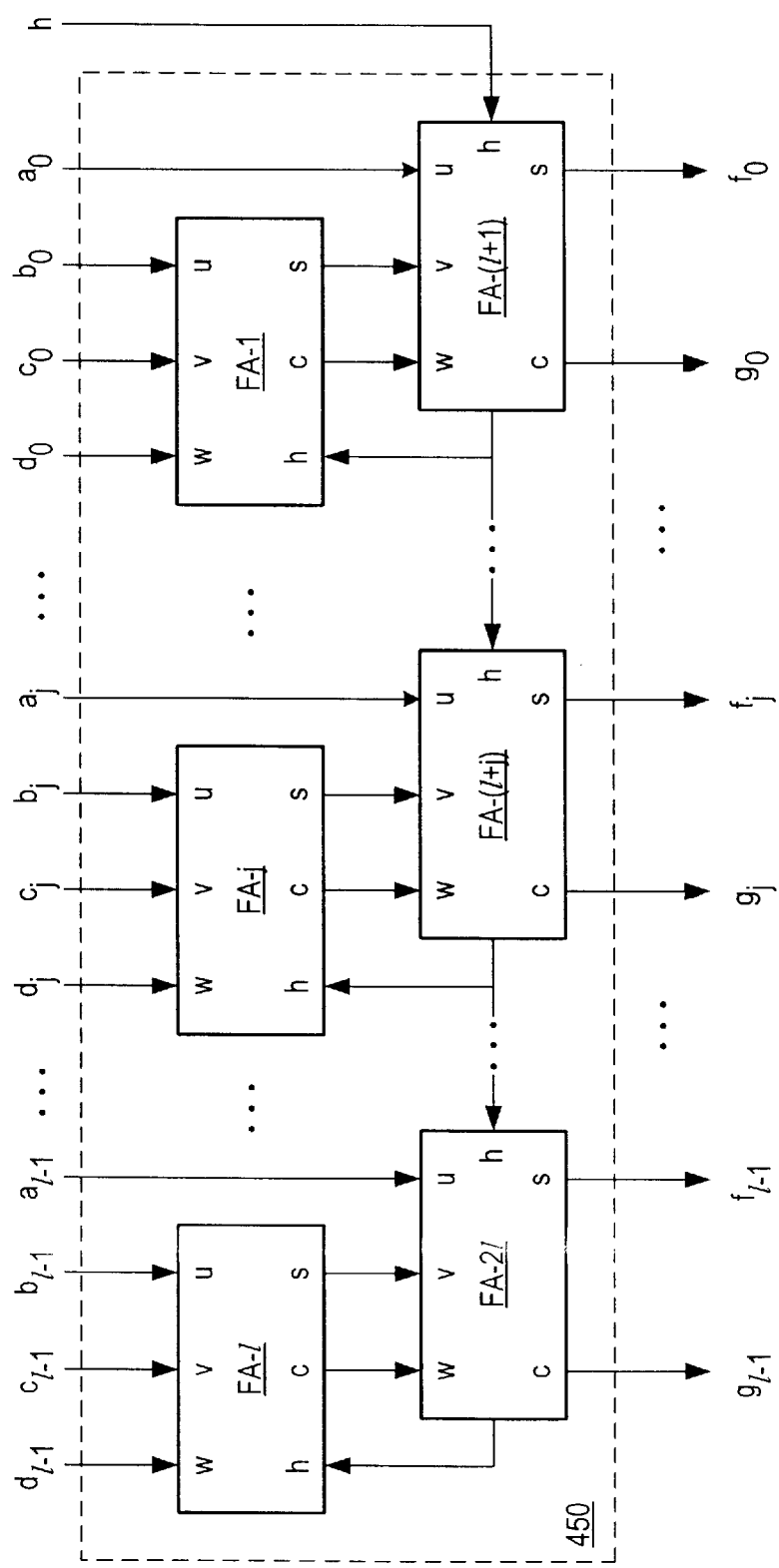
FIG. 4B is a hardware diagram of a modified carry save adder for use in an X/Y cell 402-k according to the present invention.

FIG. 4B illustrates one embodiment of a modified carry save adder 450 according to the present invention. Modified carry save adder 450 receives four input operands a, b, c and d, and generates two output operands f and g. Each of the input and output operands comprise l-bit words. For example, input operand b comprises bits bo through $b_{l-1}$. The input-output relation of modified carry save adder 450 may be described as follows. Bits occupying the $j^{th}$ position of operands $b_j$, $c_j$, and d, i.e. bits bj, c; and $d_j$ are provided to full adder FA-j. Full adder FA-j provides its carry output c and its save output s to the w and v inputs of full adder FA-(l+j). Furthermore, the $j^{th}$ bit of operand a, i.e. bit $a_j$, is provided to the u input of full adder FA-(l+j). The carry output c and save output s from full adder FA-(l+j) comprise the $j^{th}$ bits of output value g and f respectively, i.e. bits $g_j$ and $f_j$. The arithmetic control signal h is supplied to the h inputs of every full adder FA-1 through FA-(2b). Modified carry save adder 450 is referred to herein as a 4-2 carry save adder because it accepts four input operands and generates two outputs —i.e. a carry output and a save output. In one embodiment, full adders FA-l through FA-(l+j) are identical to full adder FA of FIG. 4A.

Figure 4C:
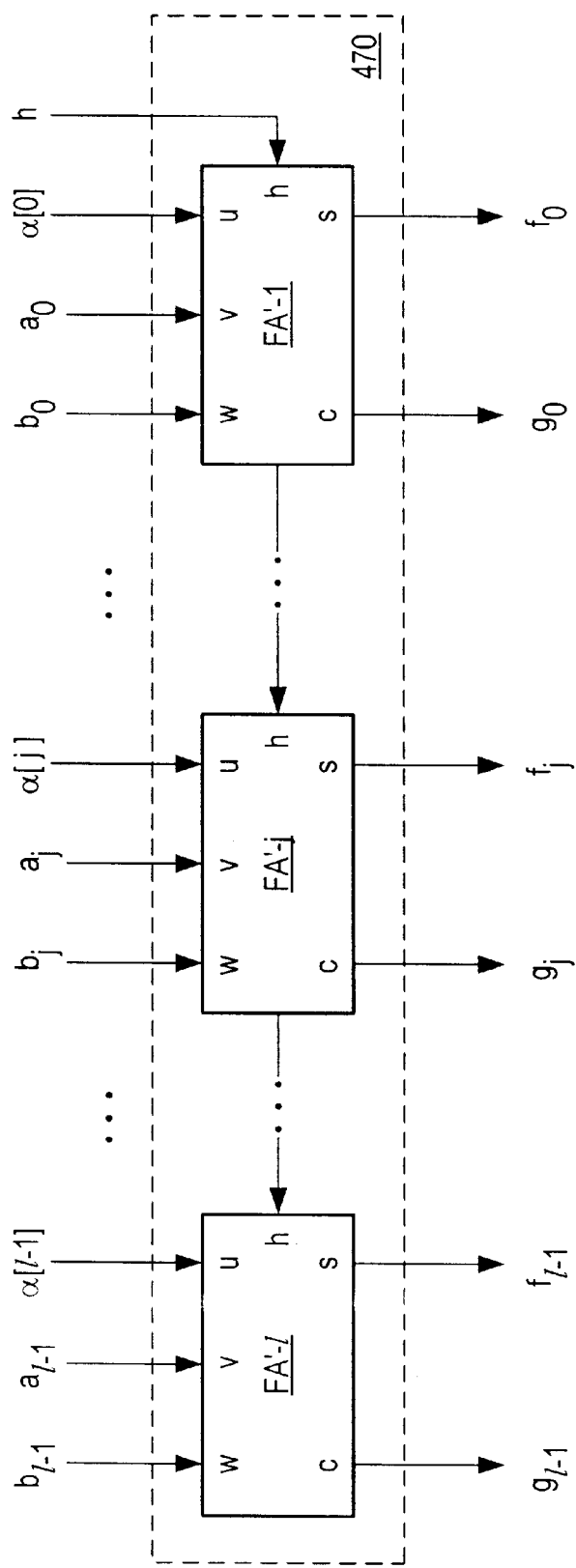
FIG. 4C is a hardware diagram of a carry save adder for use in a Z cell 403-k according to the present invention.

FIG. 4C illustrates a second embodiment of a modified carry save adder 460 according to the present invention. Modified carry save adder 470 receives three input operands a, b and $\alpha$, and a control input h, and generates two outputs f and g. Each of the input and output operands comprise an l-bit word. The input-output behavior modified carry save adder 470 may be described as follows. The $j^{th}$ bit of input operands a and b, i.e. bits aj and b are provided to inputs v and w respectively of full adder FA'-j. The $j^{th}$ bits of output operands f and g, i.e. bits $f_j$ and $g_j$ are provided by the save output s and carry output c respectively of full adder FA'-j. The arithmetic control signal input h is provided to the h inputs of each of full adders FA'-l through FA'-I. The input operand $\alpha$is one of the arctan coefficients $\alpha_i$ as defined by equation (18). Modified carry save adder 470 is also referred to herein as a 3-2 carry save adder because it accepts three inputs operands and generates two output operands —i.e. a carry value f and a save value g.

Figure 5:
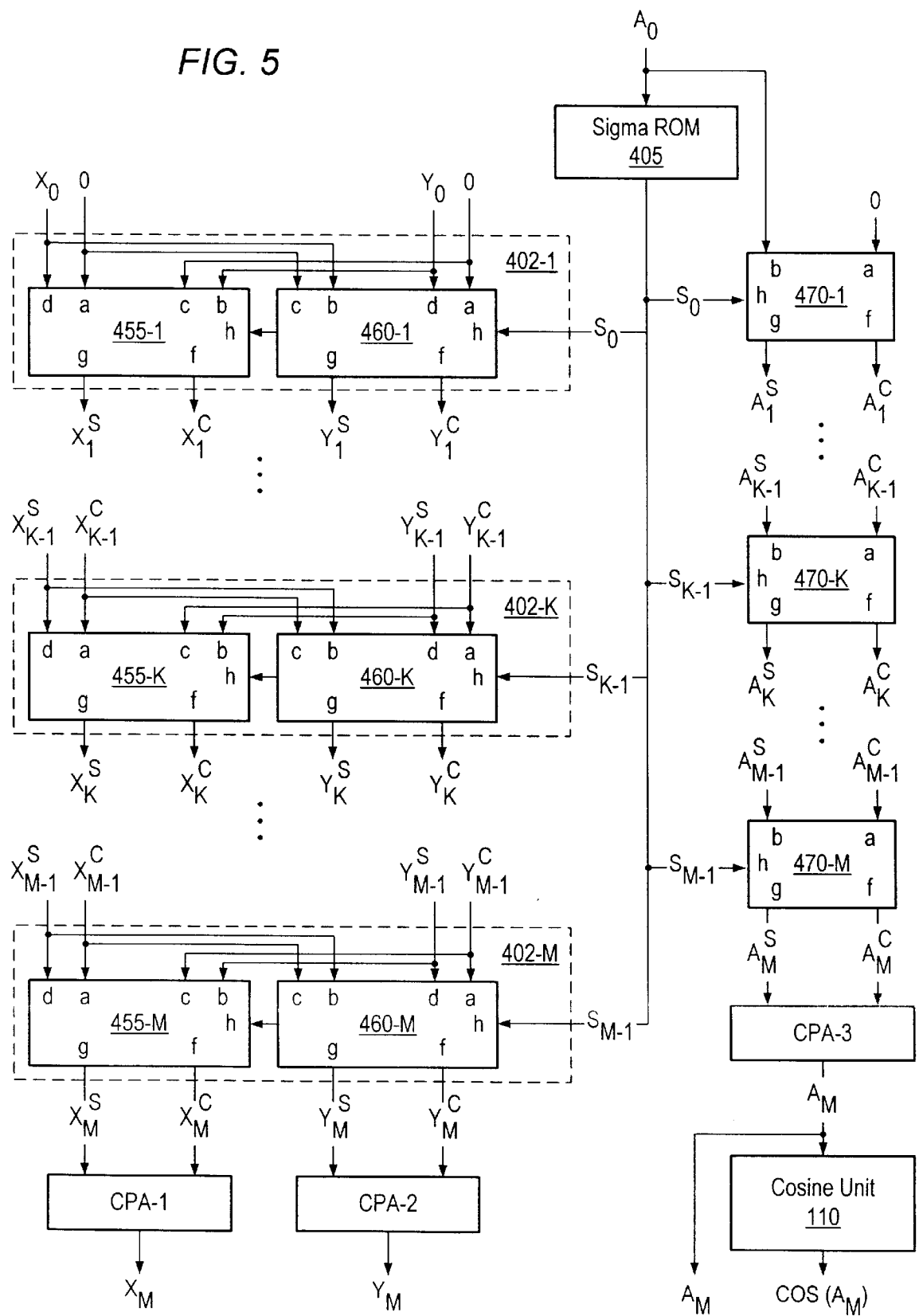
FIG. 5 is a hardware diagram of the embodiment of FIG. 3A according to the present invention.

FIG. 5 shows a hardware block diagram of the embodiment of FIG. 3A. Generic X/Y cell 402-k comprises a pair of modified carry save adders 455-k and 460-k. Generic X/Y cell 402-k represents any of X/Y cells 402-1 through 402-M. Modified carry save adders 455-k and 460-k are similar to modified carry save adder 450 of FIG. 4B. Modified carry save adder 455-k is configured to perform subtraction when its control input h takes a logical low value, and addition when its control input h takes a logical high value. In contrast, modified carry save adder 460-k is configured to perform addition when its control input h takes a logical low value, and subtraction when its control input h takes a logical high value.

Modified carry save adder 455-k receives the save and carry components of intermediate value $X_{k-1}$ at its d and a operand inputs respectively, and the save and carry Lo components of intermediate value $Y_{k-1}$ at its b and c operand inputs respectively. It is noted that the save and carry components of intermediate value $Y_{k-1}$ are shifted as shown in FIG. 2B before being applied to the operand inputs b and c. However, this pathway-connective-shifting is not shown in FIG. 5 for the sake of simplicity. The arithmetic control value $S_{k-1}$ provided by Sigma ROM 405 is supplied to the h input of modified carry save adder 455-k to control whether addition or subtraction is performed. See equation (15) above. The save and carry components of updated intermediate value $X_k$ are generated at the g and f outputs respectively of modified carry save adder 455-k.

Modified carry save adder 460-k receives the save and carry components of intermediate value $Y_{k-1}$ at its d and a operand inputs respectively, and the save and carry components of intermediate value $X_{k-1}$ at its b and c operand inputs respectively. It is noted that the save and carry components of intermediate value $X_{k-1}$ are shifted as shown in FIG. 2B before being applied to the operand inputs b and c respectively. However, this pathway-connective-shifting is not shown in FIG. 5 for the sake of simplicity. The arithmetic control value $S_{k-1}$ provided by Sigma ROM 405 is supplied to the h input of modified carry save adder 460-k to control whether addition or subtraction is performed. See equation (16) above. The save and carry components of updated intermediate value $Y_k$ are generated at the g and f outputs respectively of modified carry save adder 460-k. Modified carry save adders 455-k and 460-k may advantageously operate in parallel.

Modified carry save adder 455-1 in the first X/Y cell 402-1 receives input x-coordinate $X_0$ at its d operand input, and receives a zero value at its a operand input. Similarly, modified carry save adder 460-1 in the first X/Y cell 402-1 receives input y-coordinate $Y_0$ at its d input, and receives a zero value at its a operand input.

Modified carry save adder 455-M in the last X/Y cell 402-M supplies the save and carry components of output value $X_M$ to carry propagate adder CPA-1. Carry propagate adder CPA-1 adds the carry and save components to generate the output value $X_M$. Similarly, modified carry save adder 460-M in the last X/Y cell 402-M supplies the save and carry components of output value $Y_M$ to carry propagate adder CPA-2. Carry propagate adder CPA-2 adds the carry and save components to generate the output value $Y_M$.

Generic z-cell 403-k is implemented by modified carry save adder 470-k. Modified carry save adders 470-1 through 470-k are similar to modified carry save adder 470 of FIG. 4C, and are configured to perform (a) subtraction when the control input value h takes a logical low value, (b) addition when the control input value h takes a logical high value.

Modified carry save adder 470-k which comprises Z cell 403-k receives the carry and save components of intermediate angle $A_{k-1}$ at its a and b inputs respectively. Also, modified carry save adder 470-k receives arctan coefficient $\alpha_{k-1}$ defined by equation (18) at its $\alpha$ input. The arctan coefficients are preferably stored in a Arctan ROM (not shown) which stored precomputed values of the arctan coefficients. Modified carry save adder 470-k generates the save and carry components of updated intermediate angle $A_k$ at its g and f operand outputs respectively. Arithmetic control value $S_{k-1}$ is provided by Sigma ROM 405 to control input h of modified carry save adder 470-k to determine whether addition or subtraction is performed.

Modified carry save adder 470-1 which comprises the first Z cell 403-1 receives the input angle $A_0$ at its b operand input, and a zero value at its a operand input. Modified carry save adder 470-M which comprises the last Z cell 403-M supplies the save and carry components of output angle $A_M$ to carry propagate adder CPA-3. Carry propagate adder CPA-3 adds the save and carry components in order to generate the output angle $A_M$.

The output angle $A_M$ from carry propagate adder CPA-3 is provided to cosine computation unit 110. Cosine computation unit computes the cosine of output angle $A_M$, i.e. $\cos(A_M)$. It is noted that the Z path comprising modified carry save adders 470-1 through 470-M may have a significantly shorter propagation delay than the X/Y path comprising X/Y cells 402-1 through 402-M. This is due in part to the fact that modified carry save adder 450 includes two layers of fall adders in series while modified carry save adder 470 includes only a single layer of fall adders. The propagation time for a circuit may be defined as the time delay between presentation of an input and generation of an output.

Since, generic Z-cell 403-k may be configured with a propagation time $T_Z$ which is smaller than the propagation time $T_{x/y}$ of X/Y-cell 402-k, Z path 403 may produce output angle $A_M$ earlier than the X/Y path 402 produces output coordinates $X_M$ and $Y_M$. The total propagation time of Z path 403 is $MT_Z$. The propagation time of X/Y path 402 is $MT_{x/y}$. If the input coordinates $X_0$ and $Y_0$ are presented to the X/Y path 402 at the same time the input angle $A_0$ is presented to the Z path 403, then output angle $A_M$ may be generated $M(T_{x/y}-T_M)$ time units earlier than the output coordinates $X_M$ and $Y_M$. Therefore, cosine computation unit 110 may have headroom to complete the computation of the cosine of output angle $A_M$ prior to generation of output point $(X_M,Y_M)$ by the Z path. Multiplication units 115-1 through 115-4 may advantageously compute their respective products as soon as the output coordinates $X_M$ and $Y_M$ are available. In the embodiment of FIG. 3A, the Z path operates independently of the X/Y path. In other words, the series of Z-cells 403-1 through 403-M may generate their output values without waiting on any data computed by X/Y cells 402-1 through 402-M, and vice versa.

As mentioned above, each of CORDIC stages 401-1 through 402-M implement the operations defined by equations (15) through (17). Each of these equations involve a conditional addition or subtraction. FIG. 6 illustrates one embodiment of a conditional add/subtract operation unit 610. The embodiment of FIG. 6 may be used in X/Y cell 402-k and/or a portion of Z cell 403-k. Conditional add/subtract operation unit 610 includes a 2-1 multiplexer 612, a negation unit 614, and an adder 616. The intermediate angle $A_{k-1}$ may be supplied to a first input of the adder 616. The output of the multiplexer 612 may be supplied to a second input of the adder 616. The arctan coefficient $\alpha_{k-1}$ may be supplied to a first input of the multiplexer 612, and to the input of the negation unit 614. The output of the negation unit 614 may be supplied to a second input of the multiplexer 612. The updated intermediate angle $A_k$ is generated as the output of the adder 616. The arithmetic control value $S_{k-1}$ provided by Sigma ROM 405 or zero comparator 220 determines the selection of the multiplexer 612. The non-negated input may be selected when $S_{k-1}$ takes a first logical value, and the negated input may be selected when $S_{k-1}$ takes a second logical value, i.e. the logical complement of the first logical value.

It is noted that each of the function evaluation system embodiments shown in FIGS. 1A, 3A, 3B and 5 may be used to perform two-dimensional rotations. The input angle $A_0$ defines the angle through which the input point $(X_0,Y_0)$ is to be rotated. The resultant values R1 and R2 form the coordinates of a resultant point (R1,R2) which represent the rotated image of the input point. The function evaluation system embodiments of the present invention may therefore be especially beneficial in generating real-time graphics, and especially in the generation of graphical rotations. It is well known that the rotation of a three-dimensional vector may be implemented using a two-dimensional rotation. Thus, the function evaluation system embodiments of the present invention may be utilized in 3D graphics for the generation of rotations. A stream of points and corresponding angles may be supplied to any of the function evaluation system embodiments for the generation of an stream of rotated points, i.e. each point rotated by its corresponding angle.

FIG. 7 shows one embodiment of a method for evaluating a function in a microprocessor using a succession of M CORDIC iterations. As shown in FIG. 7, the method comprises the following operations. In step 710, a first point is accessed from a first memory location. The first memory location may be reside in a memory buffer such as, e.g., in a system memory of a host computer. The memory buffer may store a plurality of points to be operated on by the present method embodiment. Alternatively, the first memory location may be a register within a microprocessor, or a location within a data cache of a microprocessor. In step 720, a first angle value is accessed from a second memory location. As with the first memory location, the second memory location may reside in a memory buffer such as, e.g., in the system memory of a host computer. Alternatively, the second memory location may be a register in a microprocessor, or a location within a data cache of a microprocessor.

In step 730, a succession of CORDIC iterations is applied to the first point and the first angle value in order to generate an output point and an output angle value $A_M$. Each of the CORDIC iterations comprises a shift operation and one or more arithmetic operations. The shift operation implements multiplication by a power of two.

In step 740, a rotation operation is applied to the output point and the output angle $A_M$ in order to generate a first resultant value RV1 and/or a second resultant value RV2. Step 740 includes one or more of the following components steps. In step 742, the cosine of the output value is computed and the computed cosine value $\cos(A_M)$ is multiplied by a first coordinate C1 of the output point to generate a first product PR1. In step 744, the output angle is multiplied by a second coordinate C2 of the output point in order to generate a second product PR2. In step 746, the second product PR2 is subtracted from the first product PR1 to generate the first resultant value RV1. In step 748, the cosine value is multiplied by the second coordinate C2 of the output point to generate a third product PR3. In step 750, the output angle is multiplied by the first coordinate C1 of the output point to generate a fourth product PR4. In step 752, the third product is added to the fourth product to generate the second resultant value RV2.

The first resultant value RV1 may represent an evaluation of a first function on the first angle as an argument. The second resultant value RV2 may represent an evaluation of a second function on the first angle as an argument. The first function and second function may be trigonometric functions, inverse trigonometric functions, hyperbolic functions, exponential functions, logarithm functions, or any combination thereof.

In one alternate embodiment, the first resultant value may represent the evaluation of a third function operating on said first point as an argument, i.e. a function of two variables. Also, the second resultant value RV2 may represent an evaluation of a fourth function operating on the first point. For example, the first resultant value may represent the radius of the first point $(X_0, Y_0)$ with respect to the origin.

In another embodiment, the first resultant value RV1 and the second resultant value RV2 define coordinates of a rotated point (RV1,RV2) in two dimensions, wherein the rotated point corresponds to an image of the first point rotated by the first angle value.

In the preferred embodiment, the number M of CORDIC iterations in the succession referred to above is greater than or equal to $\frac{1}{3} \cdot [N+2-\log_2(3)]$, where N is the bit precision of the first resultant value or the second resultant value. Also, in the preferred embodiment, the number M of CORDIC iterations is less than (N+1)/2.

It is noted that the function evaluation method embodiment of FIG. 7 may be utilized for performing a two-dimensional rotation. In this case, the first point $(X_0, Y_0)$ specifies a location in a two-dimensional coordinate system, and the first angle defines the angle by which the first point is to be rotated. The first resultant value RV1 and second resultant value RV2 together compose the rotated image of the first point where the rotation angle corresponds to the first angle value. In the preferred embodiment, the rotation angle equals the first angle value.

In one embodiment, step 730, i.e. the step of applying a succession of CORDIC iterations to the first point and the first angle value, comprises providing the first point and the first angle value to an unfolded CORDIC hardware unit as illustrated, e.g., in CORDIC stages 401-1 through 401-M of FIG. 3A. An unfolded CORDIC hardware unit includes a plurality of CORDIC hardware stages. Thus, the succession of CORDIC iterations are spread out geographically, one CORDIC hardware stage for each CORDIC iteration. The unfolded CORDIC hardware unit generates the output point and output angle value.

It is noted that the unfolded CORDIC hardware unit may be configured as a pipeline for pipelined computation on a stream of input points including the first point and a corresponding stream of input angle values including the first angle value.

The following pseudo-code routine presents one realization of the method embodiment of FIG. 7. The routine operates on an input point $(X_0, Y_0)$ and an input angle $A_0$.

```
X = X0
Y = Y0
A = A0
M = (N +1)/3 round up if needed
for k = 0 to (M - 1)
        dX = X/2^k
        dY = Y/2^k
        dA = atan(1/2^k)
        if (A.GE.0) then                  (25)
             X = X - dY
             Y = Y + dX
             A = A - dA
        else
             X = X + dY
             Y = Y - dX
             A = A + dA
        endif
next
R1 = cos(A)*X - A*Y                       (26)
R2 = A*X + cos(A)*Y                       (27)
```

The routine may be compiled into machine code for execution by a microprocessor. The operands X, Y and A may represent the contents of registers internal to the microprocessor. The routine above iteratively updates registers X, Y and A. These registers are initialized with the input x-coordinate X0, the input y-coordinate Y0, and the initial angle A0 respectively. At the beginning of each iteration, increment variables dX, dY, and dA are computed. The increment dX is assigned the value of X divided by $2^k$, where k is the iteration index. The increment dY is assigned the value of Y divided by the same power of two. It is noted that these divisions may be efficiently implemented with a shift operation. The angle increment dA is assigned the arctangent of $2^{-k}$, i.e. the angle in the range −90 degrees to 90 degrees whose tangent equals $2^{-k}$. In the conditional branch instruction (24), the sign of the angle A is tested. If the angle A is greater than or equal to zero, registers X, Y and A are updated as indicated by equations (15) through (17) with the control value taking the value one. If the angle A is less than zero, registers X, Y and A are updated according to the same set of equations with the control value taking the value negative one. The contents of the X and Y registers after the M CORDIC iterations is rotated by the angle residing in register A. This rotation is implemented by instructions (25) and (26).

Figure 8:
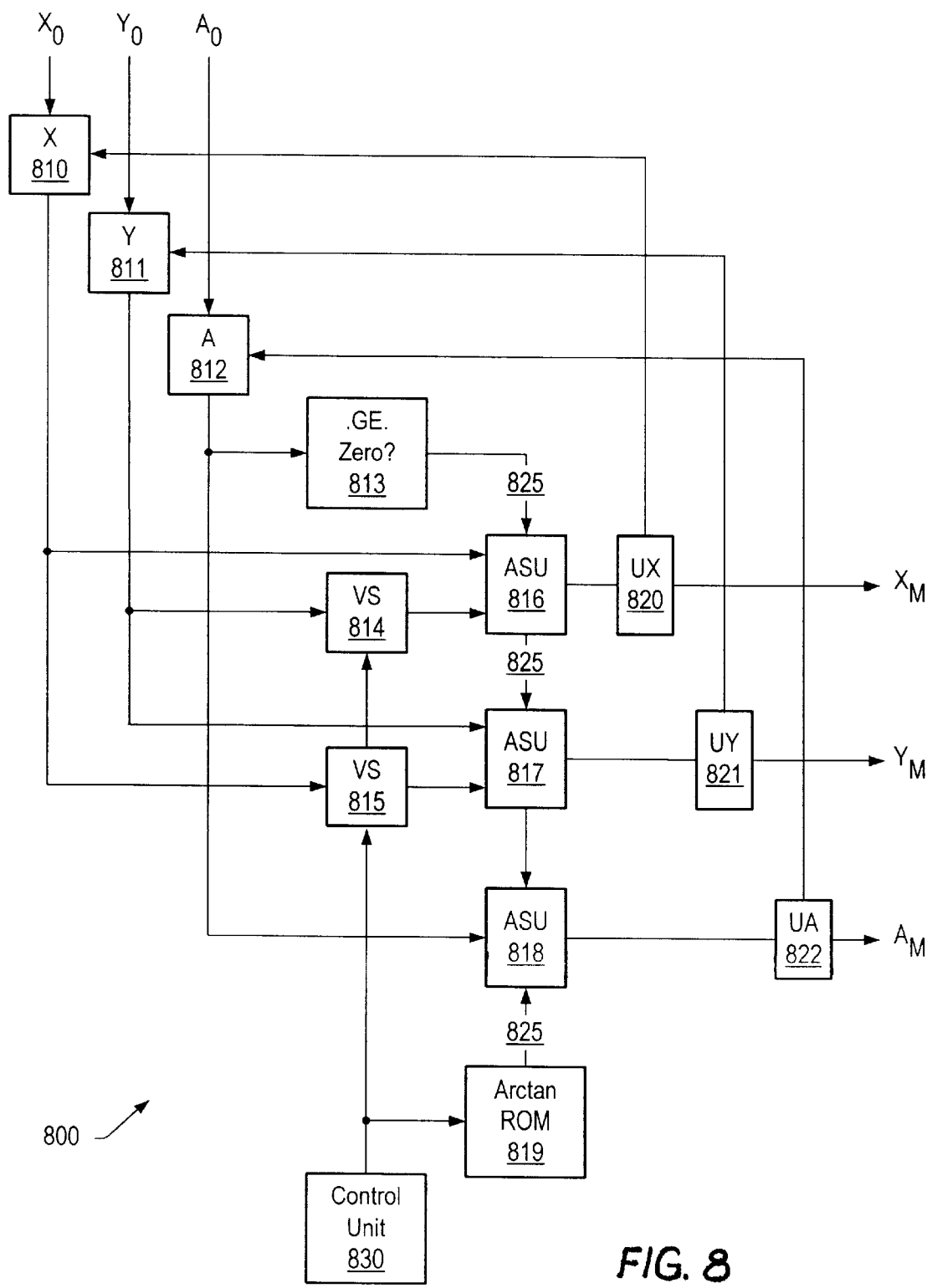
FIG. 8 illustrates a single-stage CORDIC hardware unit suitable for sequential execution of a succession of CORDIC iterations.

FIG. 8 illustrates single-stage CORDIC hardware unit 800 which sequentially executes the each of the M CORDIC iterations comprising the succession of step 730. The input x-coordinate $X_0$ and y-coordinate $Y_0$ are presented to the X register 810 and Y register 811 respectively. Also, the input angle $A_0$ is presented to the angle register 812. X register 810 supplies its contents to a first input of add/subtract unit 816, and to the input of variable shifter 815. Y register 811 supplies its contents to the input of variable shifter 814 and to a first input of add/subtract unit 817. Angle register 812 supplies its contents to zero comparator 813 and to a first input of add/subtract unit 818.

Zero comparator 813 determines if the angle value A is greater than or equal to zero and drives arithmetic control signal 825 accordingly. The arithmetic control signal determines whether each of the add/subtraction units 816–818 perform an addition or subtraction operation. Variable shifters 814 and 815 perform a shift operation on their respective input values. The bit displacement distance of the shift operation is determined by an input supplied by control unit 830. The shifted output provided by variable shifter 814 is supplied to a second input of add/subtract unit 816. The shifted output provided by variable shifter 815 is supplied to a second input of add/subtract unit 817.

If the angle value A is greater than or equal to zero, zero comparator 813 drives the arithmetic control signal 825 to a first logical state which induces add/subtract units 816–818 to perform subtraction, addition and subtraction respectively. In cases of subtraction, the second input value is subtracted from the first input value. If the angle value A is less than zero, zero comparator 813 drives the arithmetic control signal 825 to a second logical state (complementary to the first logical state) which induces add/subtract units 816–818 to perform addition, subtraction and addition respectively. Again, in cases of subtraction, the second input value is subtracted from the first input value.

Add/subtraction units 816–818 perform the updates associated with equations (15)–(17) respectively. Add/subtract unit 818 receives at its second input an arctangent coefficient from Arctan ROM 819. The arctangent coefficient takes a value consistent with equation (18). Control unit 830 may be used to control the selection of the arctangent coefficient.

The outputs of add/subtract unit 816–818 are latched by updated X register 820, updated Y register 821 and updated angle register 822. Control unit 830 counts the number of CORDIC iterations which have traversed. If the number of CORDIC iterations so far performed is less than M, control unit 830 induces another CORDIC iteration. The contents of the updated X register 820, updated Y register 821 and updated angle register 822 are fed back to X register 810, Y register 811 and angle register 812 respectively for the next CORDIC iteration. If the number of CORDIC iterations so far performed is equal to M, the feed back path is disabled. At this time, the updated value registers 820–822 contain the coordinates $X_M$ and $Y_M$ of the output point and the output angle value $A_M$. The output point is then rotated by the output angle as described in step 740 above.

Figure 9:
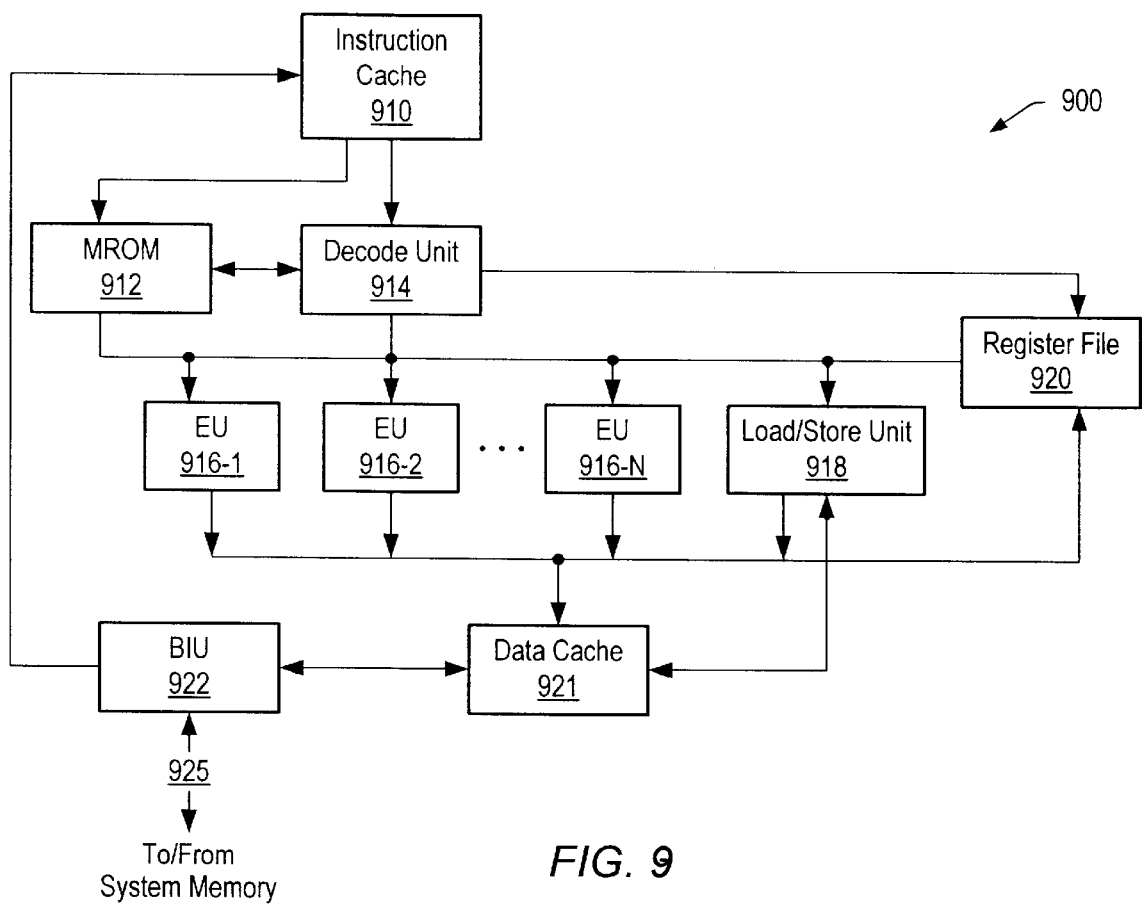
FIG. 9 illustrates one embodiment of a microprocessor 900 according to the present invention.

FIG. 9 illustrates one embodiment of a microprocessor 900 according to the present invention. Microprocessor 900 includes a bus interface unit 922 for interfacing with a system memory (not shown) through system bus 925. Bus interface unit 925 receives program instructions from system memory and transmits the program instructions to instruction cache 910. Instruction cache stores the program instructions in a plurality cache lines. Instruction decode unit 914 accesses program instruction stored in instruction cache 914, and decodes the program instructions. The decoded instructions are dispatched to execution units 916-1 through 916-N and/or load/store unit 918. Execute units 916-1 through 916-N (collectively referred to as execute units 916) perform program operations in response to the decoded instructions received from decode unit 914. Register file 920 includes a plurality of registers for storing operands. Register file 920 provides input operands for operations to be performed by execute units 916, and stores output operands produced by the execute units 916. Load/store unit 918 executes load or store instructions. Load/store unit 918 is coupled to data cache 921. Data cache 921 stores images of portions of system memory (not shown) in a plurality of cache lines. Memory accesses which hit the data cache 921 are supplied with decreased access time. Thus, processing bandwidth is increased. Data cache 921 communicates with system memory (not shown) through bus interface unit 922.

Microprocessor 900 may also include a microcode ROM 912. Microcode ROM 912 may be coupled to instruction cache 910, decode unit 914, execution units 916, and load/store unit 918. Microcode ROM 912 may receive signals from instruction cache 910 and/or decode unit 914 which invoke the execution of a stored microcode routine. In response to such invocation signals microcode ROM 912 provides microcode instructions to execution units 916 and/or load/store unit 918. The invocation signals preferably define an entry point in the microcode ROM 912 at which address the start of a microcode routine resides.

In one embodiment of microprocessor 900, step 730, i.e. the step of applying a series of CORDIC iterations to the first point ($X_0, Y_0$) and the first angle value $A_0$, comprises executing each of the succession of CORDIC iterations in one or more of execution units 916 and load/store unit 918. For example, one of execution units 916 may include single-stage CORDIC hardware unit 800 as shown in FIG. 8. In one embodiment, one or more of execution units 916 includes a conditional add/subtract operation unit 610 as shown in FIG. 6. In another embodiment, one or more of execution units 916 include an unfolded CORDIC structure as is exemplified (a) in CORDIC stages 401-1 through 401-M of FIG. 3A, (b) in X/Y path 402 of FIG. 3B, and/or (c) in angle path 403 of FIG. 3B.

In one alternative embodiment, the execution of each CORDIC iteration in one or more execution units is controlled by a microcode routine invoked by a program instruction. For example, a CORDIC instruction which includes an operand for specifying the number M of CORDIC iterations to be performed may be provided by microprocessor 900 to invoke the microcode routine.

COSINE COMPUTATION DEVICE

Figure 10:
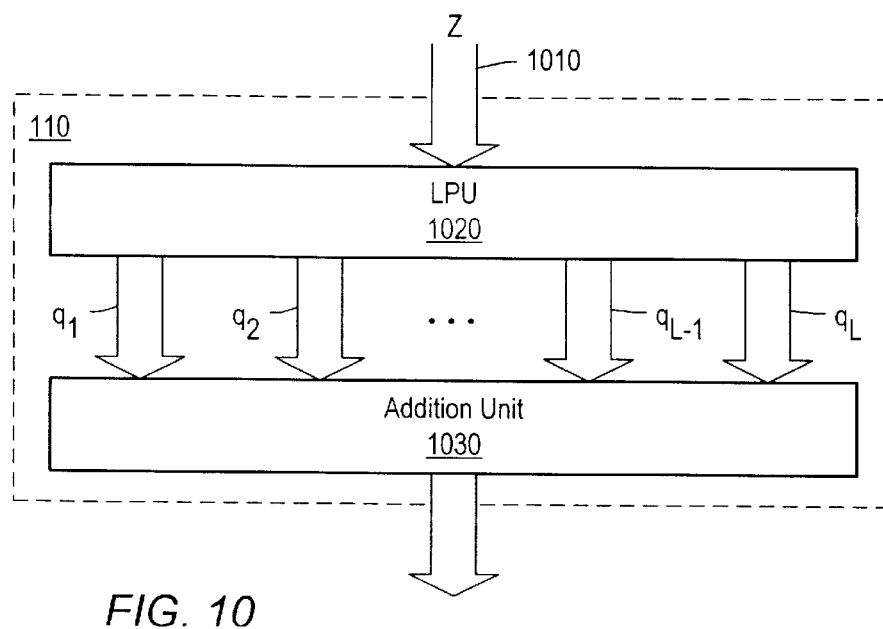
FIG. 10 illustrates one embodiment of a cosine computation unit according to the present invention.

FIG. 10 illustrates one embodiment of a cosine computation unit 110 according to the present invention. Cosine computation unit 110 comprises input bus 1010, logical processing unit 1020 coupled to input bus 1010, and addition unit 1030 coupled to outputs of logical processing unit 1020. An angle operand Z is supplied to cosine computation unit 110 through input bus 1010. Thus, input bus 1010 comprises a plurality of input lines. In the preferred embodiment of cosine computation unit 110, a number of the leading bits of the input value are guaranteed to be equal to zero. Thus, the input lines of the input bus correspond to bit positions in the input value which are less significant than the leading bits which are guaranteed to be zero.

In FIGS. 1B, 3B and 5, the angle $A_M$ generate by last CORDIC stage 401-M serves at the input value Z to the cosine computation unit 110. An analysis of the CORDIC algorithm shows that angle $A_M$ is guaranteed to be less than $2^{-(M-1)}$. Thus, a leading number of bits in angle $A_M$ are guaranteed to be equal to zero.

Logical processing unit 1020 couples to input bus 1010, and comprises a first plurality of gates (see e.g. FIG. 11A) coupled to the input bus 1010. In the preferred embodiment of logical processing unit 1020, the first plurality of gates are AND gates. Each gate of the first plurality of gates couples to two or more of the input lines. In one embodiment, each of the first plurality of gates is coupled to exactly two of the input lines. Logical processing unit 1020 comprises L output buses denoted $q_1$ through $q_L$. Each of the output buses comprises a plurality of output lines. At least one of the L output buses, say $q_j$, includes at least one output line which is coupled to an output of one of the first plurality of gates and (b) at least one output line which is coupled to one of the input lines of the input bus. The number L of output buses is greater than or equal to two.

Addition unit 1030 couples to the L output buses of the logical processing unit 1020, and is configured to perform an addition of L binary numbers corresponding to the N output buses and to generate a resultant number which corresponds to a cosine of the input value.

In one embodiment, each of the L output buses includes:
(a) a first subset of one or more output lines each of which is driven by a corresponding gate of the first plurality of gates;
(b) a second subset of one or more output lines each of which is set equal to a logical zero value; and
(c) a third subset of zero or more output lines each of which is coupled to a corresponding one of the input lines.

Figure 11A:
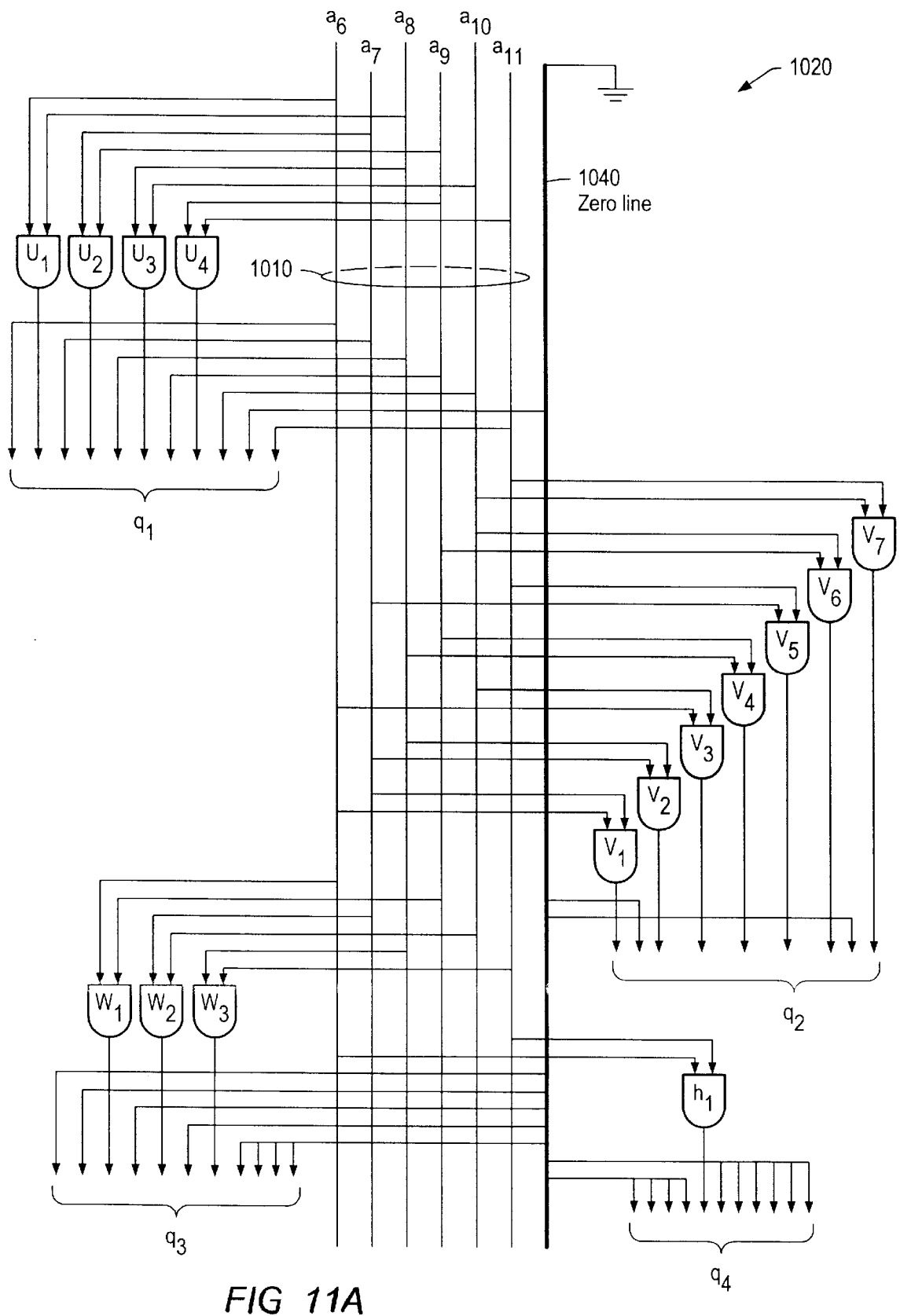
FIG. 11A is a hardware diagram for one embodiment of logical processing unit 1020.

FIGS. 11A illustrates one embodiment of logical processing unit 1020. As shown, the embodiment of FIG. 11A includes a plurality of AND gates denoted U1–U4, V1–V7, W1–W3 and H1. Angle operand Z is provided to input bus 1010 and has the form given by FIG. 11B. The binary point for angle operand Z is immediately to the left of bit $a_0$. Bits positions $a_0$ through $a_5$ are guaranteed to be equal to zero. The remaining bit positions, i.e. positions $a_6$ through $a_{11}$ may assume any value. It is noted the output angle $A_M$ from a succession of CORDIC stages will have six leading zeros as shown if the number M of CORDIC stages is greater than or equal to seven.

Input bus 1010 comprises a plurality of input lines corresponding to the bit positions $a_6$ through $a_{11}$ of the input angle operand Z which may assume non-zero values. Logical processing unit 1020 includes four output buses denoted $q_1$ through $q_4$. The input-output relation of logical processing unit 1020 is given by the table of FIG. 11C. Each output bus $q_j$ comprises a set of eleven output lines and corresponds to an output operand. The most significant of the eleven output lines corresponds to the $2^{-13}$ bit position of the output operand, and the least significant of the eleven output lines corresponds to the $2^{-23}$ bit position of the output operand. The notation (m,n) implies that the corresponding output line is the result of an AND operation between input lines $a_m$ and $a_n$. The notation (n) implies that the corresponding output line is coupled to input line an. The presence of a zero in a cell of the table above implies that the corresponding output line is hardwired to the logical zero state, i.e. tied to the zero line 1040. For example, the $2^{-13}$ output line of output bus $q_1$ is coupled to input line $a_6$. The $2^{-14}$ output line of output bus $q_1$ is coupled to the output of AND gate $U_1$ which performs an AND operation on input lines $a_6$ and $a_8$. The $2^{-22}$ output line of output bus $q_1$ is tied to the logical zero line 1040.

AND gates U1–U4 drive four of the output lines comprising output bus $q_1$. AND gates V1–V7 drive seven of the output lines comprising output bus $q_2$. AND gates W1–W3 drive three of the output lines comprising output bus $q_3$. AND gate H1 drives one of the output lines comprising $q_4$.

It is noted that logical processing unit 1020 embodied in FIG. 11A comprises a single layer of AND gates. Thus, the propagation delay between input bus 1010 and output buses $q_1$ through $q_4$ is one AND gate propagation time. Thus, the outputs $q_1$ through $q_4$ may advantageously be generated with a small time delay.

Figure 11D:
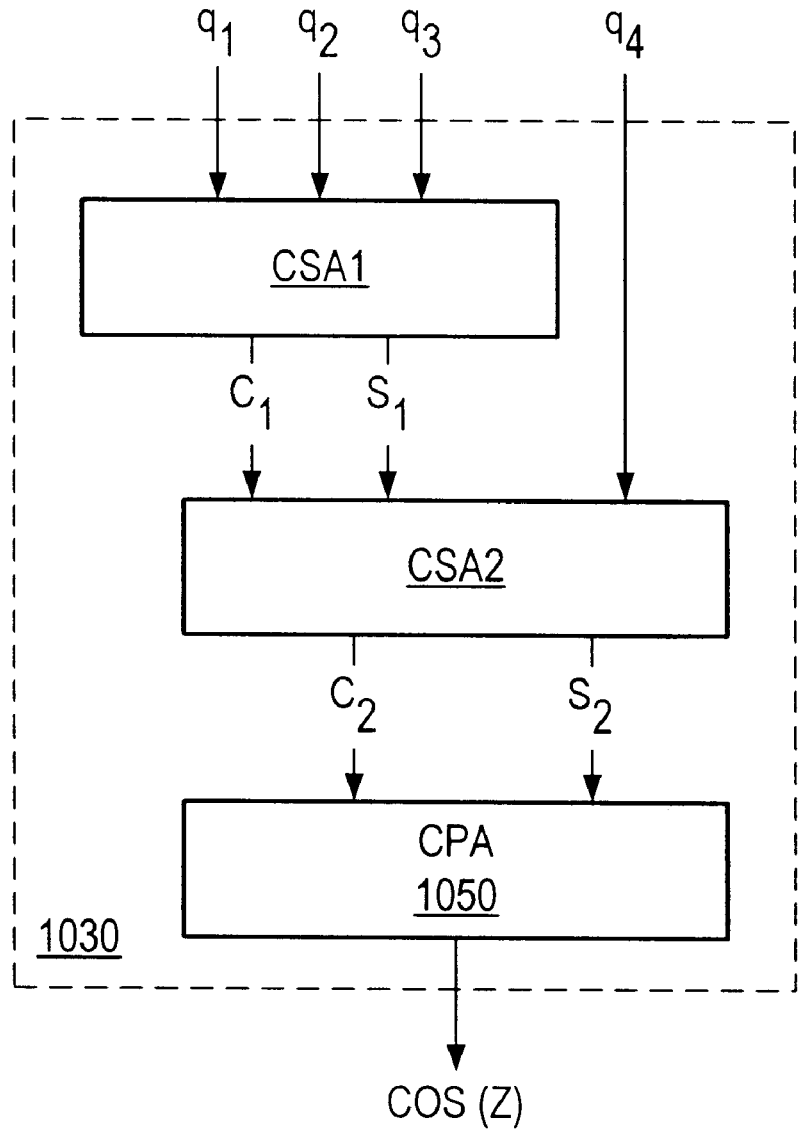
FIG. 11D presents one embodiment of addition unit 1030.

FIG. 11D illustrates an embodiment of addition unit 1030 which may operate compatibly with the embodiment of logical processing unit 1020 shown in FIG. 11A. Addition unit 1030 includes a first carry save adder CSA1, a second carry save adder CSA2 and a carry propagate adder 1050. First carry save adder CSA1 is coupled to three of the output buses from logical processing unit 1030. In FIG. 11D, first carry save adder CSA1 is shown coupled to output buses $q_1$ through $q_3$. However, it is noted that any three of the output buses $q_1$ through $q_4$ may serve as the three inputs to first carry save adder CSA1. First carry save adder CSA1 adds the operands corresponding to output buses $q_1$ through $q_3$, and generates a carry output $c_1$ and a save output $s_1$.

Second carry save adder CSA2 is coupled to output bus $q_4$, and to carry output $c_1$ and save output $s_1$. Second carry save adder CSA2 adds the operand conveyed on output bus $q_4$ and the operands conveyed on carry output $c_1$ and save output $s_1$, and thereby generates carry output $c_2$ and save output $s_2$.

Carry propagate adder 1050 is coupled to carry output $c_2$ and save output $s_2$. Carry propagate adder 1050 adds the operands conveyed on carry output $c_2$ and save output $S_2$ respectively, and generates a resultant number which corresponds to the cosine of the angle operand z provided to logical processing unit 1020.

FIGS. 12A and 12B illustrate a second embodiment of logical processing unit 1020 which may be especially suited for achieving 24 bits of precision (N=24) in the function evaluation system embodiments of FIGS. 1A, 3A and 5 where the number M of CORDIC stages equals nine. FIG. 12A is a table which illustrates the format of the input angle operand Z supplied to the logical processing unit 1020 embodied in FIG. 12B. The input angle operand Z comprises a 16-bit input word. The leading most significant bits $a_0$ through $a_8$ are guaranteed to be equal to zero, while the remaining bits $a_9$ through $a_{15}$ may assume any value. It is noted that the output angle $A_M$ generated by the succession of CORDIC stages 401-1 through 401-M may be guaranteed to have nine leading zero values as shown when M is greater than or equal to 10. Recall that angle $A_M$ is smaller than $2^{-(M-1)}$.

FIG. 12B is a table which summarizes the input-output relation of a second embodiment of logical processing unit 1020. Logical processing unit 1020 generates five output operands which are provided of five corresponding output buses denoted $q_1$ through $q_5$. Each of output buses $q_1$ through $q_5$ comprises 15 output lines. The most significant of the output lines corresponds to weight $2^{-19}$, and the least significant of the output lines corresponds to weight $2^{-33}$. A cell in the table of FIG. 12B which contains a pair of numbers "m,n" indicates that the corresponding output line is generated by performing an AND operation between input lines $a_m$ and $a_n$. A cell which contains a single number "n" indicates that the corresponding output line is generated by coupling the output line to input line $a_n$. A cell which is empty indicates that the corresponding output line is hardwired to zero.

It is noted that the logical processing unit 1020 embodied in FIG. 12B comprises a single layer of AND gates coupled between the input bus 1010 and output buses $q_1$ through $q_5$. Thus, the overall propagation time of cosine computation unit 110 according to the present invention may advantageously be significantly smaller than cosine computation devices of the prior art.

In other embodiments of cosine computation unit 110, logical processing unit 1020 may comprise a second plurality of gates, where each of the second plurality of gates includes (a) a first input coupled to an output of one of said first plurality of gates and (b) an output conductor coupled to an output line of one of said N output buses. The second input of each of the second plurality of gates may be coupled to one of the input lines comprising the input bus or to an output of one of the first plurality of gates. The second plurality of gates are preferably AND gates.

Figure 13:
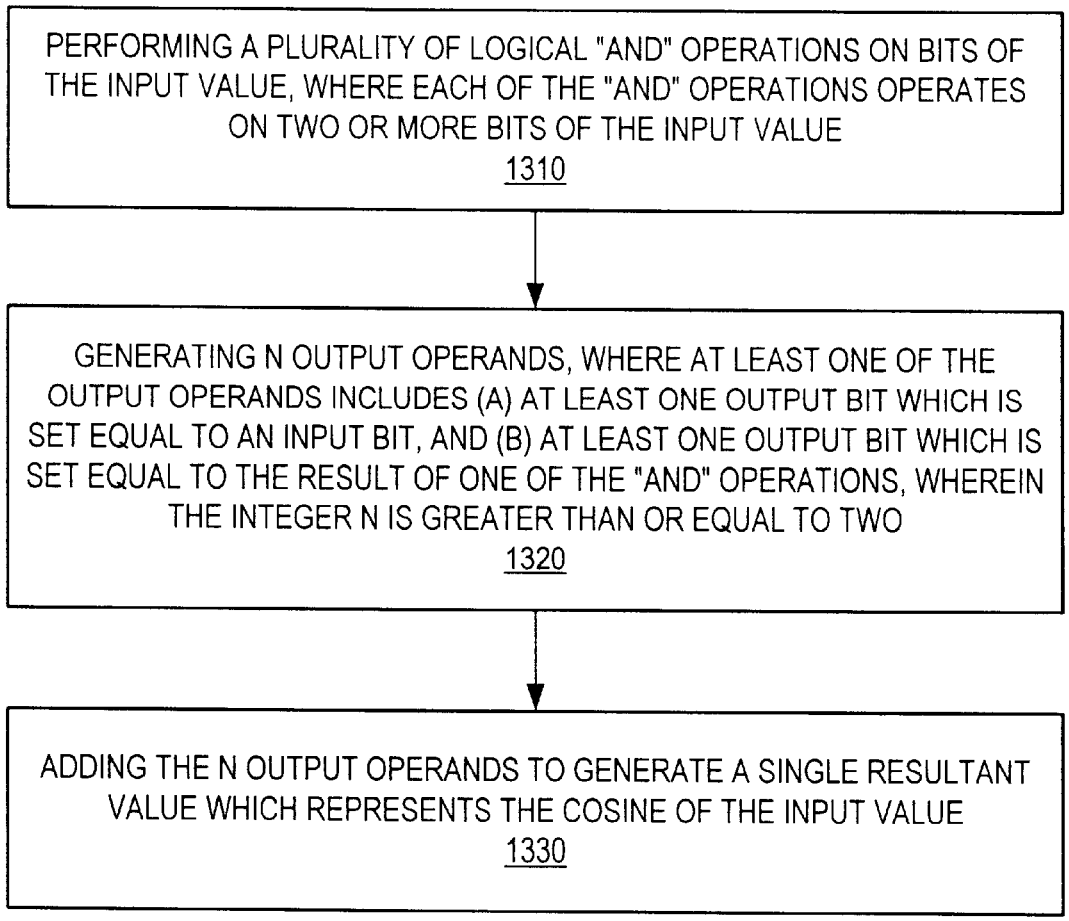
FIG. 13 is a flowchart of one embodiment of a method for computing a cosine of an input value according to the present invention.

FIG. 13 presents a flowchart for one embodiment of a method for computing the cosine of an input value according to the present invention. In step 1310, a plurality of AND operations is performed on bits of the input value. Each of the AND operations operates on two or more bits of the input value. In the preferred embodiment of step 1310, each of the AND operations operates on exactly two bits of the input value.

In step 1320, a set of N output operands is generated. At least one of the output operands includes (a) at least one output bit which is set equal to an input bit, and (b) at least one output bit which is set equal to the result of one of the AND operations. The number N of output operands is greater than or equal to two. In step 1330, the N output operands are added to generate a single resultant value which represents the cosine of the input value. See the tables of FIGS. 11C or 12B for exemplary embodiments of steps 1310 and 1320.

In one embodiment, each of said output operands comprises (a) one or more first output bits each of which is set equal to the result of a corresponding AND operation, and (b) one or more second output bits each of which is set equal to a logical zero value. See the table of FIG. 11C for example, where the output operand $q_4$ includes one output bit which is set equal to the logical AND of inputs $a_6$ and $a_{11}$.

The method of the present invention assumes that a predetermined number of leading bits of the input value are guaranteed to be equal to zero. The plurality of AND operations operate on bits of the input value which are less significant than the leading bits which are guaranteed to be equal to zero.

What is claimed is:

1. A cosine computation device comprising:
   an input bus comprising a plurality of input lines, wherein the input bus is configured to receive an input value;
   a logical processing unit coupled to the input bus, wherein the logical processing unit includes a first plurality of gates coupled to the input bus, wherein each gate of the first plurality of gates couples to two or more of the input lines, wherein the logical processing unit comprises N output buses, wherein at least one of said output buses includes (a) at least one output line which is coupled to an output of one of said first plurality of gates and (b) at least one output line which is coupled to one of the input lines of the input bus, wherein N is greater than or equal to two;
   an addition unit coupled to the N output buses of the logical processing unit, wherein the addition unit is configured to perform an addition of N binary numbers corresponding to the N output buses and generate a resultant number which corresponds to a cosine of the input value.

2. The cosine computation device of claim 1 wherein each of said first plurality of gates is coupled to two of said input lines.

3. The cosine computation device of claim 1, wherein each of said first plurality of gates is an AND gate.

4. The cosine computation device of claim 1, wherein each of said output buses comprises (a) one or more first output lines each of which is driven by a corresponding gate of said first plurality of gates and (b) one or more second output lines each of which is set equal to a logical zero value.

5. The cosine computation device of claim 1 wherein the addition unit comprises:
   a first carry save adder coupled to three output buses of said N output buses, wherein said first carry save adder is configured to add three binary numbers of said N binary numbers corresponding to said three output buses;
   a second carry save adder coupled (a) to a fourth output bus of said N output buses and (b) to outputs of said first carry save adder, wherein said second carry save adder is configured to add a first number and a second number provided as outputs of the first carry save adder and a fourth number corresponding to the fourth output bus;
   a carry propagate adder coupled to outputs of said second carry save adder, wherein the carry propagate adder is configured to generate the resultant number by adding two numbers corresponding to the outputs of said second carry save adder.

6. The cosine computation device of claim 1 wherein a first number of leading bits of said input value are guaranteed to be equal to zero, wherein said input lines receive bit values of said input value which are less significant than the leading bits which are guaranteed to be equal to zero.

7. The cosine computation device as recited in claim 1, further comprising a second plurality of gates, wherein each of said second plurality of gates includes (a) a first input coupled to an output of one of said first plurality of gates and (b) an output conductor coupled to an output line of one of said N output buses.

8. The cosine computation device as recited in claim 7, wherein said second plurality gates includes a first subset of gates, wherein each gate of said first subset includes a second input coupled to a second output of a second one said first plurality of gates.

9. The cosine computation device as recited in claim 7, wherein said second plurality of gates includes a second subset of gates, wherein each gates of said second subset includes another input coupled to one of the input lines of the input bus.

10. The cosine computation device of claim 7 wherein each of said second plurality of gates are AND gates.

11. A method for computing the cosine of an input value, the method comprising:
    performing a plurality of AND operations on bits of the input value, wherein each of the AND operations operates on two or more bits of the input value;
    generating N output operands, wherein at least one of the output operands includes (a) at least one output bit which is set equal to an input bit, and (b) at least one output bit which is set equal to the result of one of said AND operations, wherein N is greater than or equal to two;
    adding the N output operands to generate a single resultant value which represents the cosine of the input value.

12. The method of claim 11, wherein each of said AND operations operates on exactly two bits of the input value.

13. The method of claim 11, wherein each of said output operands comprises (a) one or more first output bits each of which is set equal to the result of a corresponding AND operation, and (b) one or more second output bits each of which is set equal to a logical zero value.

14. The method of claim 11 wherein a first number of leading bits of said input value are guaranteed to be equal to zero, wherein said AND operations operate on bits of the input value which are less significant than the leading bits which are guaranteed to be equal to zero.

* * * * *